United States Patent
Chugunov et al.

(10) Patent No.: US 8,548,785 B2
(45) Date of Patent: Oct. 1, 2013

(54) METHOD FOR UNCERTAINTY QUANTIFICATION IN THE PERFORMANCE AND RISK ASSESSMENT OF A CARBON DIOXIDE STORAGE SITE

(75) Inventors: Nikita V. Chugunov, Arlington, MA (US); Eric Leon Stabinski, Boston, MA (US); Terizhandur S. Ramakrishnan, Boxborough, MA (US); Romain de Loubens, Pau (FR); Yusuf Bilgin Altundas, Cambridge, MA (US); Laura Espinal, Rockville, MD (US)

(73) Assignee: Schlumberger Technology Corporation, Sugar Land, TX (US)

( * ) Notice: Subject to any disclaimer, the term of this patent is extended or adjusted under 35 U.S.C. 154(b) by 381 days.

(21) Appl. No.: 12/768,021

(22) Filed: Apr. 27, 2010

(65) Prior Publication Data

US 2010/0299126 A1    Nov. 25, 2010

Related U.S. Application Data

(60) Provisional application No. 61/173,025, filed on Apr. 27, 2009.

(51) Int. Cl.
*G06G 7/48* (2006.01)
(52) U.S. Cl.
USPC ...................... 703/10; 703/2; 703/6
(58) Field of Classification Search
USPC .......................................................... 703/10
See application file for complete search history.

(56) References Cited

U.S. PATENT DOCUMENTS

| | | | |
|---|---|---|---|
| 5,838,634 A | 11/1998 | Jones et al. | |
| 6,766,254 B1 | 7/2004 | Bradford et al. | |
| 6,860,147 B2 * | 3/2005 | Gunter et al. | 73/152.05 |
| 6,932,155 B2 * | 8/2005 | Vinegar et al. | 166/245 |
| 7,221,158 B1 | 5/2007 | Ramakrishnan | |
| 7,277,796 B2 * | 10/2007 | Kuchuk et al. | 702/7 |
| 7,457,758 B2 | 11/2008 | Zimmerman | |
| 7,512,543 B2 | 3/2009 | Raghuraman et al. | |
| 7,983,929 B2 * | 7/2011 | Zimmerman | 705/1.1 |
| 2002/0013687 A1 * | 1/2002 | Ortoleva | 703/10 |
| 2002/0184069 A1 | 12/2002 | Kosiba et al. | |
| 2003/0225606 A1 | 12/2003 | Raghuraman et al. | |
| 2008/0005304 A1 | 1/2008 | Diao et al. | |
| 2008/0015829 A1 | 1/2008 | Jandhyala et al. | |
| 2008/0133194 A1 | 6/2008 | Klumpen et al. | |
| 2009/0043555 A1 | 2/2009 | Busby et al. | |

OTHER PUBLICATIONS

Walton et al, "Geological Storage of CO2: A Statistical Approach to Assessing Performance and Risk", Proceedings of 7th International Conference on Greenhouse Gas Control Technologies, Sep. 5-9, 2004.*

(Continued)

*Primary Examiner* — Mary C Jacob
(74) *Attorney, Agent, or Firm* — Rachel E. Greene; Jakub Michna; Bridget Laffey

(57) ABSTRACT

A $CO_2$ sequestration site is evaluated by incorporating a consistent petrophysical framework having uncertainties expressed in the form of probability density functions of wellbore measurements, by systematically propagating the uncertainties in generating probability density functions or cumulative distribution functions of the parameters used in a reservoir simulation, by using the reservoir simulation to transform the first set of parameters into output variables with uncertainties, and by using the output variables and uncertainties to generate an answer product from which uncertainty levels of performance metrics can be ascertained.

20 Claims, 15 Drawing Sheets

(56) References Cited

OTHER PUBLICATIONS

Lucier et al, "Assessing the Economic Feasibility of Regional Deep Saline Aquifier CO2 Injection and Storage: A Geomechanics-Based Workflow Applied to the Rose Run Sandstone in Eastern Ohio, USA", International Journal of Greenhouse Gas Control 2, 2008, pp. 230-247, published online Feb. 1, 2008.*

Doughty et al, "Site Characterization for CO2 Geologic Storage and Vice Versa: The Frio Brine Plot, Texas, USA As a Case Study", Evniron. Geol. 54:1635-1656, 2008.*

Kovscek et al, "Geologic Storage of Carbon Dioxide and Enhanced Oil Recovery. I. Uncertainty Quantification Employing a Streamline Based Proxy for Reservoir Flow Simulation", Energy Conservation and Management 46, pp. 1920-1940, 2005.*

Shafeen et al, "CO2 Sequestration in Ontario, Canada. Part I: Storage Evaluation of Potential Reservoirs", Energy Conservation and Management 45, pp. 2645-2659, 2004.*

Lucier et al, "Geomechanical Aspects of CO2 Sequestration in a Deep Saline Reservoir in the Ohio River Valley Region", Environmental Geosciences, vol. 3, No. 2, pp. 85-103, Jun. 2006.*

Kovesk et al, "Geologic Storage of Carbon Dioxide and Enhanced Oil Recovery I. Uncertainty Quantification Employing a Streamline Based Proxy for Reservoir Flow Simulation", Energy Conversion and Management 46, pp. 1920-1940, 2005.*

Stauffer et al, "A System Model for Geologic Sequestration of Carbon Dioxide", Environmental Science and Technology, vol. 43, No. 3, 2009.*

Stauffer et al, "A System Model for Geologic Sequestration of Carbon Dioxide", Environmental Science and Technology, 2009, 43 (3), Web Publication date Dec. 17, 2008).*

International Search Report of PCT Application No. PCT/US2010/032497 dated Jan. 21, 2011: pp. 1-3.

Archer et al., "ANOVA-like Techniques and the Use of Bootstrap," J. Statist. Comput. Simul., 1997, vol. 58: pp. 99-120.

Box et al., "Empirical Model-Building and Response Surfaces," Wiley Series in Probability and Statistics, 1987: pp. 1-19.

Chugunov et al., "Probabilistic Methods for Uncertainty Quantification," Encyclopedia of Decision Making and Decision Support Technologies vol. II, 2008: pp. 732-742.

Davidson et al., "Putting Carbon Back in the ground," IEA Greenhouse Gas R & D Program Feb. 2001: pp. 1-28.

Durlofsky, "Upscaling of geocellular models for reservoir flow simulation: a review of recent progress," Proceedings of the 7th International Forum on Reservoir Simulation, Jun. 2003: pp. 1-58.

Gunter et al., "Large CO2 Sinks: Their role in the mitigation of greenhouse gases from an international, national (Canadian) and provincial (Alberta) perspective," Applied Energy, 1998, vol. 61: pp. 209-227.

Helton et al., "Latin hypercube sampling and the propagation of uncertainty in analyses of complex systems," Reliab. Eng. Syst. Saf., 2003, Vo. 81: pp. 23-69.

Holloway, "An overview of the Joule II project: The underground disposal of carbon dioxide," Energy Conversion and Management, 1997, vol. 38: pp. 193-198.

Iman et al., "An approach to sensitivity analysis of computer models, Part I, Introduction, input variable selection and preliminary variable assessment," Journal of Quality Technology, 1981, vol. 13(3): pp. 174-183.

Journel et al., "Chapter 1: Geostatistics and mining Applications," Mining Geostatistics, New York: Academic Press, 1978, pp. 7-25.

Land, "Calculation if Imbibition Relative Permeability for Two- and Three-phase flow from rock properties," SPE Journal, 1968, vol. 8(2): pp. 149-156.

Ramakrishnan et al., "Effect of capillary number on the relative permeability function for two phase flow in porous media," Powder Technology, 1986, vol. 48: pp. 99-124.

Ramakrishnan et al., "Formation reducibility and fractional flow curves from radial resistivity variation caused by drilling fluid invasion," Phys. Fluids, 1997, vol. 9(4): pp. 833-844.

Saltelli et al., "Global Sensitivity Analysis: The Primer," Chichester: John Wiley & Sons, Ltd., 2008: pp. 164-169.

Saltelli et al., "Chapter 6: Sensitivity Analysis in Diagnostic Modelling: Monte Carlo Filtering and Regionalised Sensitivity Analysis, Bayesian Uncertainty Estimation and Global Sensitivity Analysis," Sensitivity Analysis in Practice. A Guide to ASsessing Scientific Models, Chichester: John Wiley & Sons, Ltd., 2004: pp. 151-192.

Sobol, "Global sensitivity indices for nonlinear mathematical models and their Monte Carlo estimates," Math Comput. Simul., 2001, vol. 55: pp. 271-280.

Sobol, "Sensitivity estimates for nonlinear mathematical models," Math. Modeling & Comp. Exp., 1993, vol. 1: pp. 407-414.

\* cited by examiner

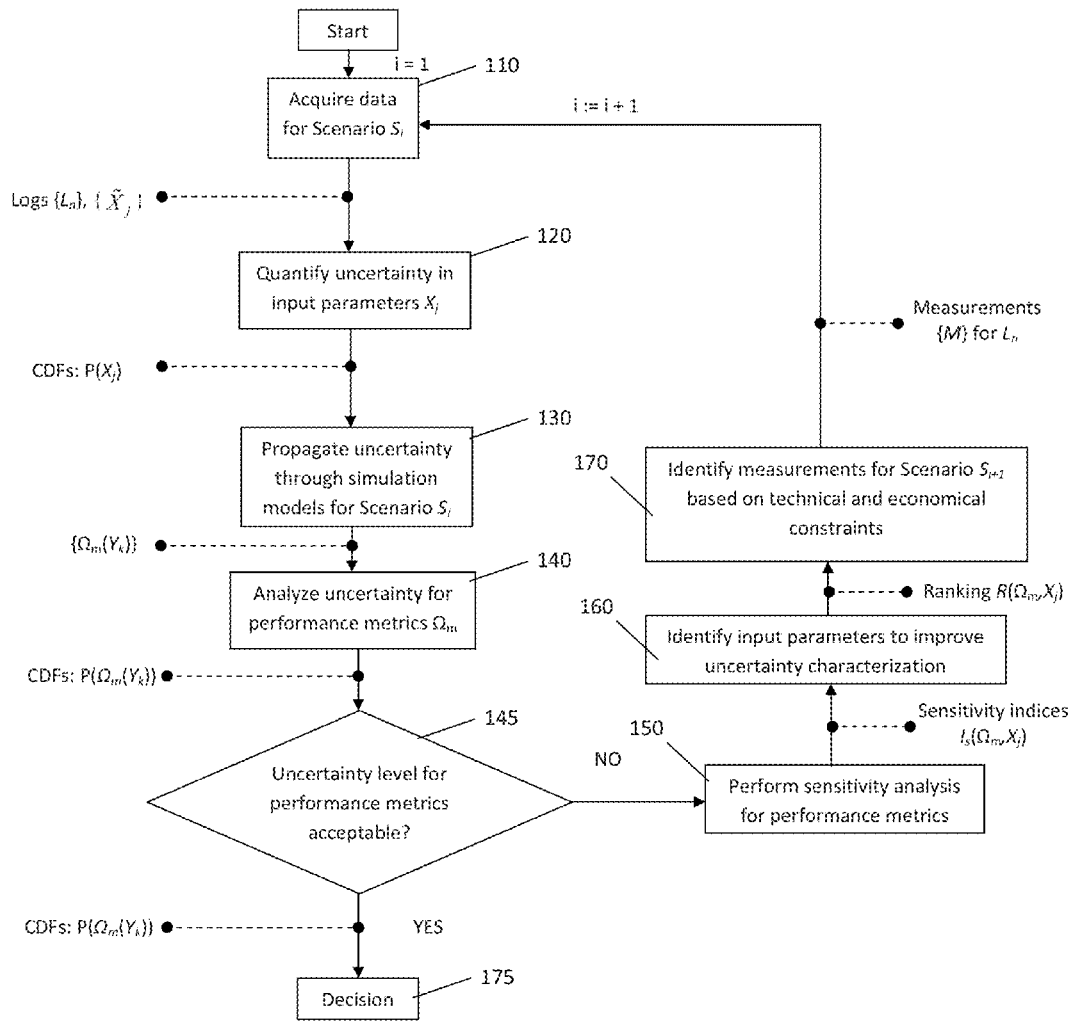
FIG.1 SCENARIO-BASED UNCERTAINTY CHARACTERIZATION WORKFLOW (100).

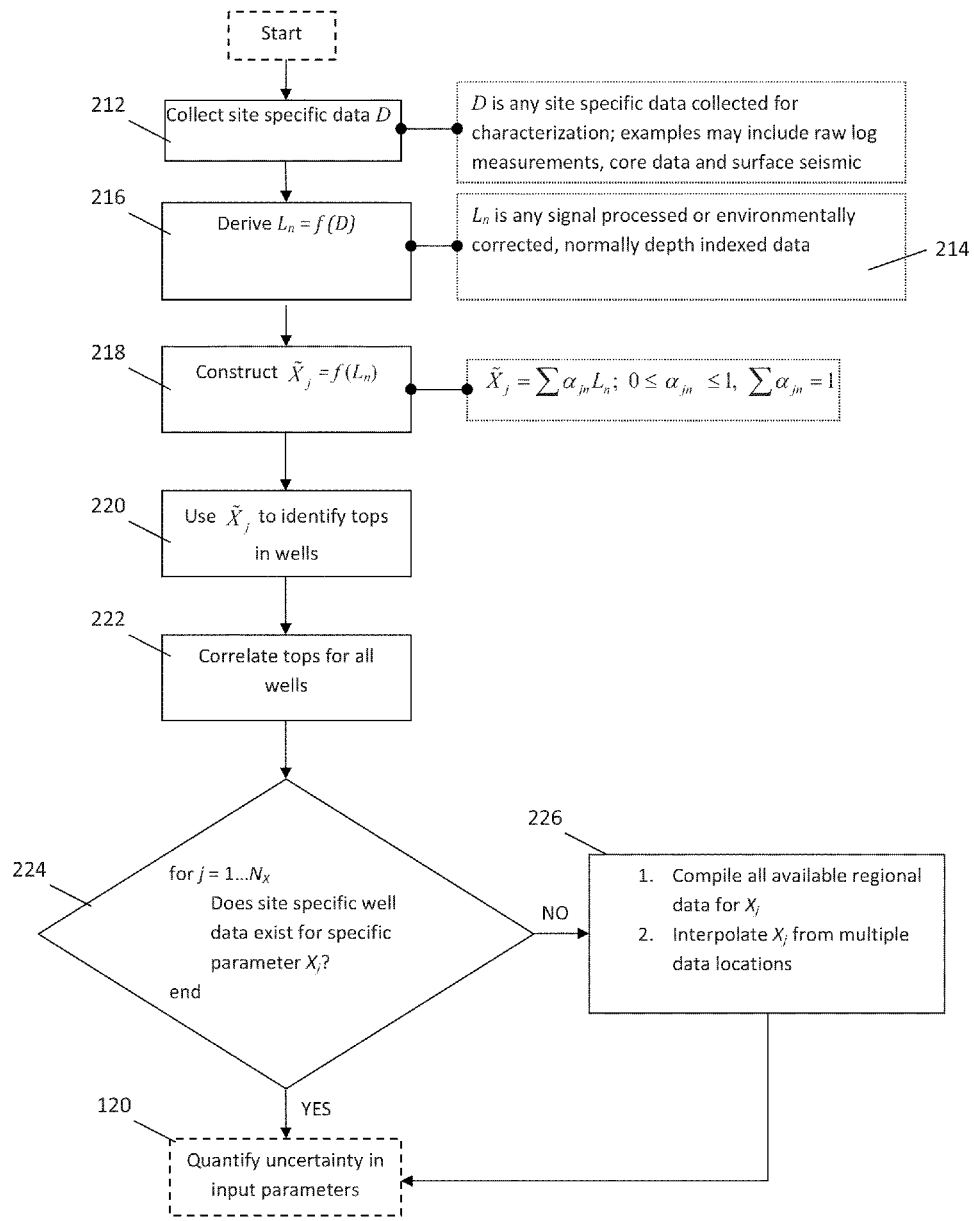

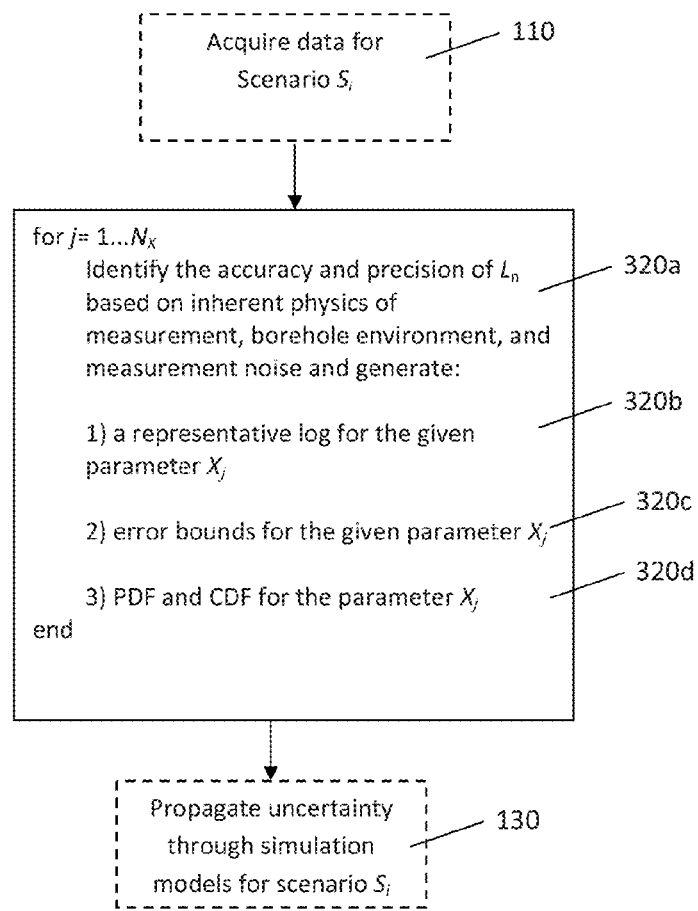

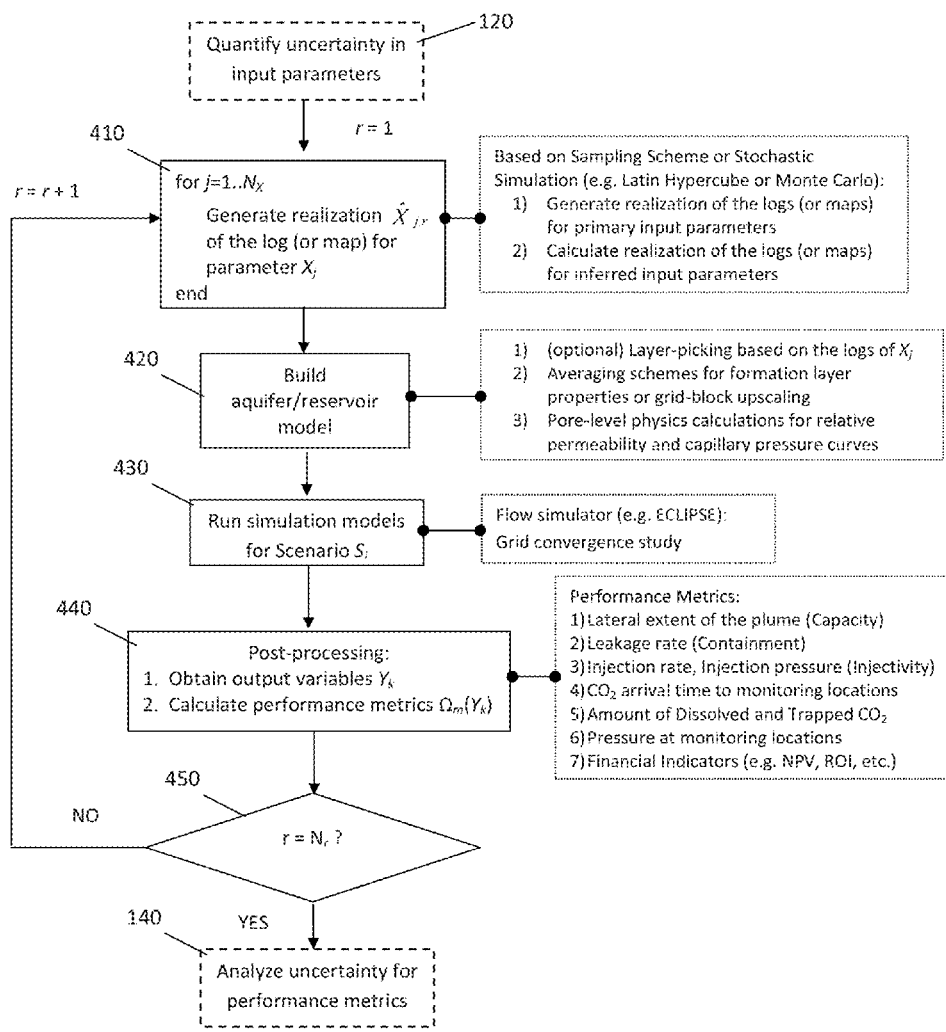
FIG. 4. UNCERTAINTY PROPAGATION WORKFLOW (400).

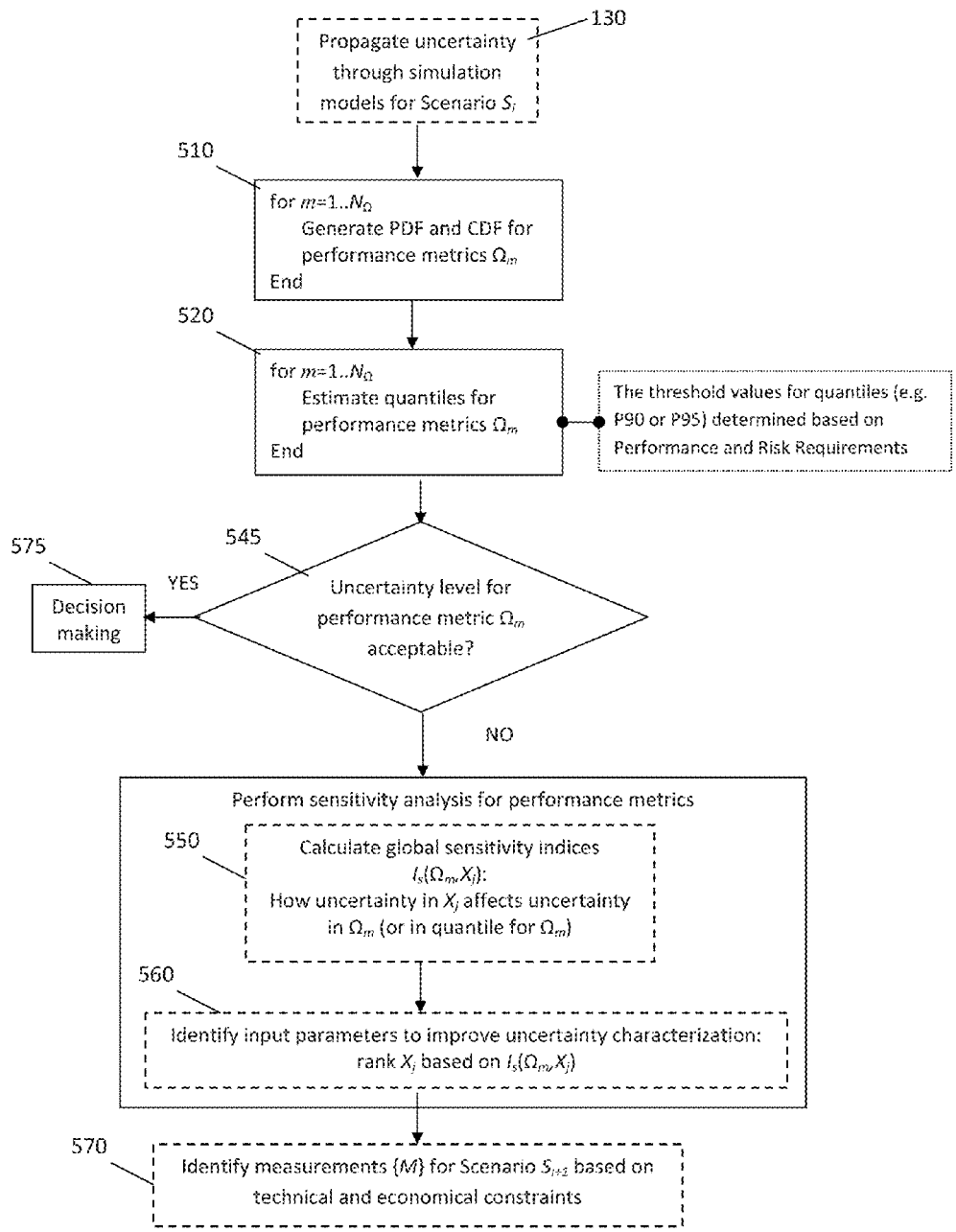

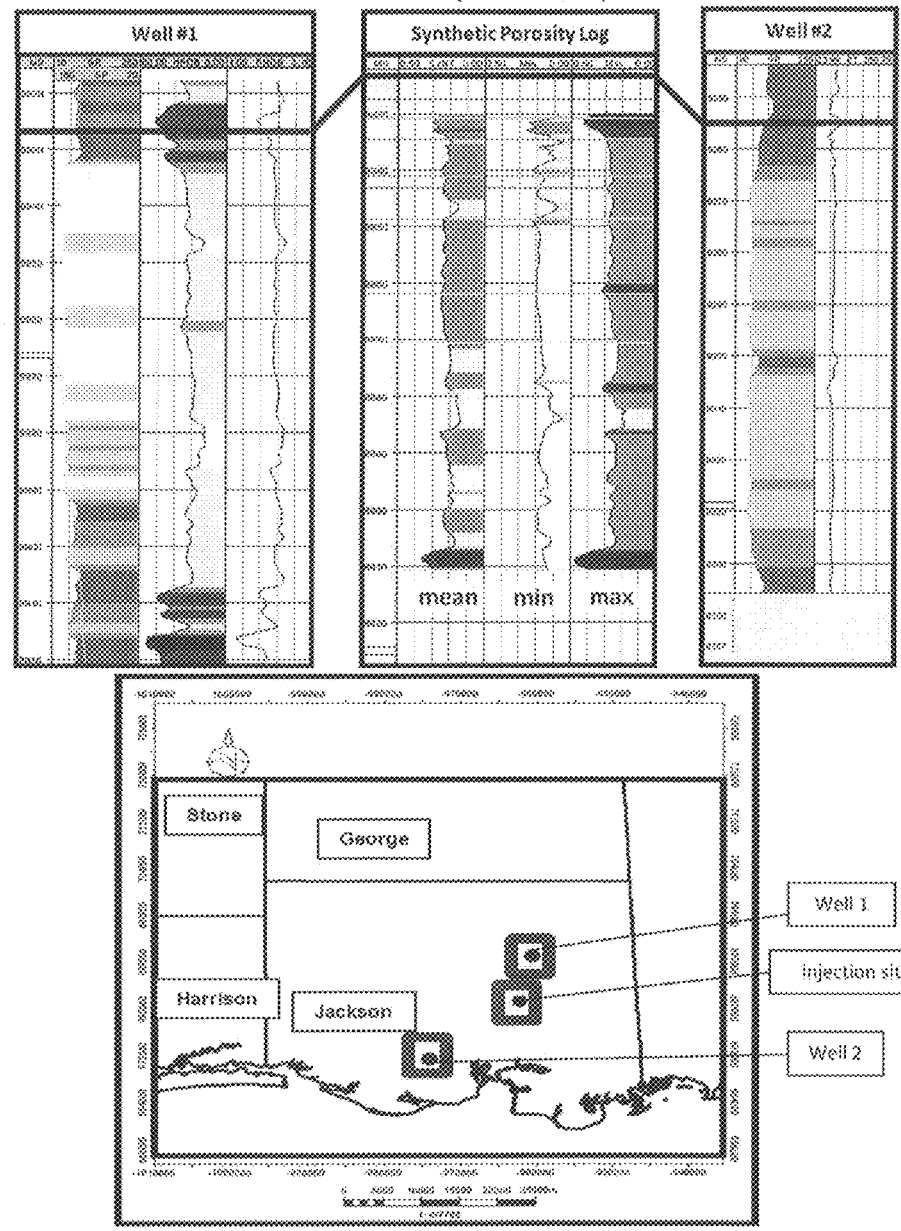

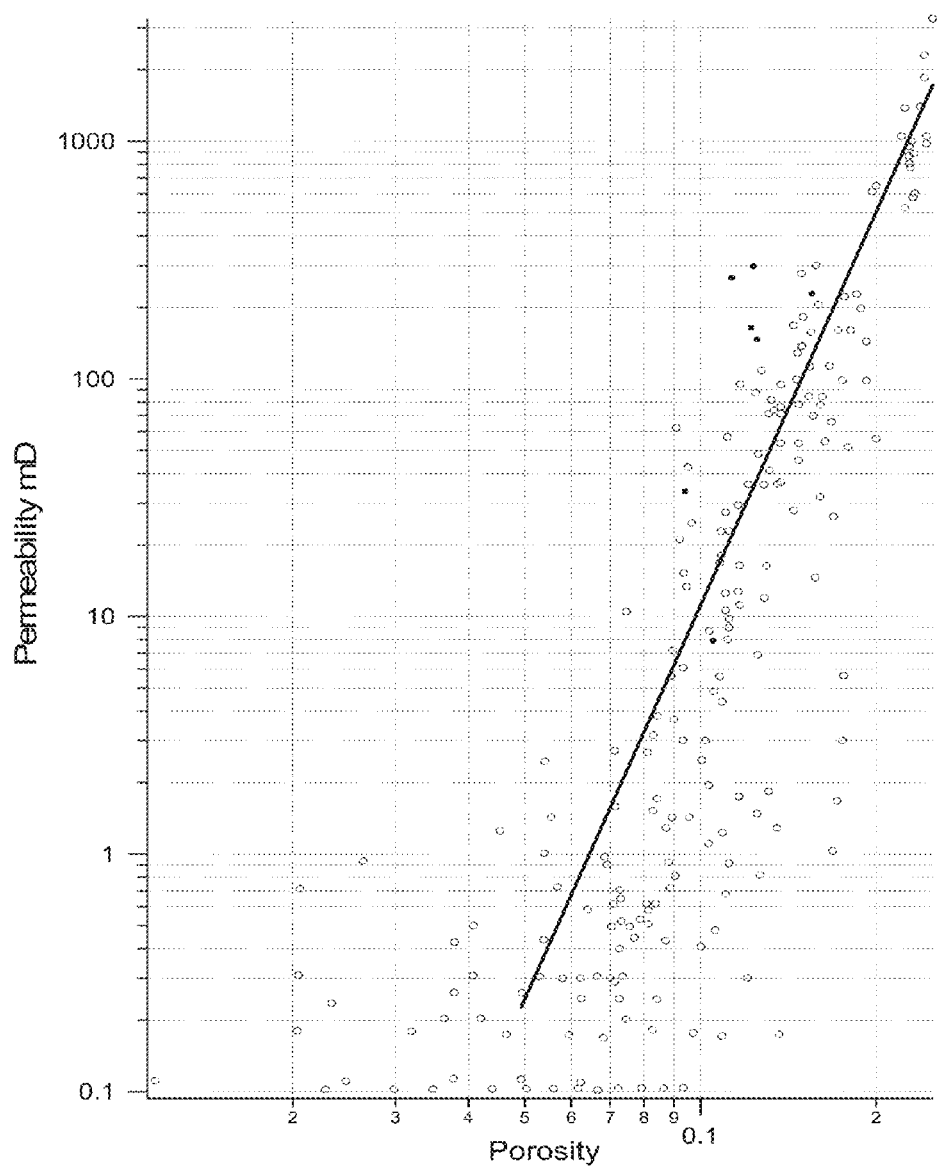
FIG. 7. REGIONAL DATA FOR POROSITY-PERMEABILITY CORRELATION

FIG. 8. POROSITY LOGS FOR EACH SCENARIO
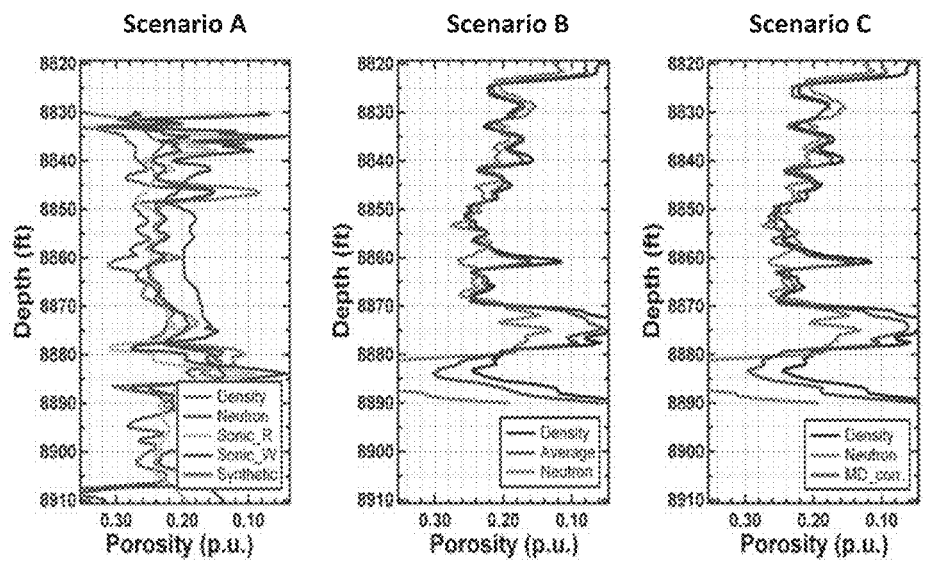
FIG. 9. AVERAGE, MINIMUM AND MAXIMUM VALUES FOR POROSITY LOGS
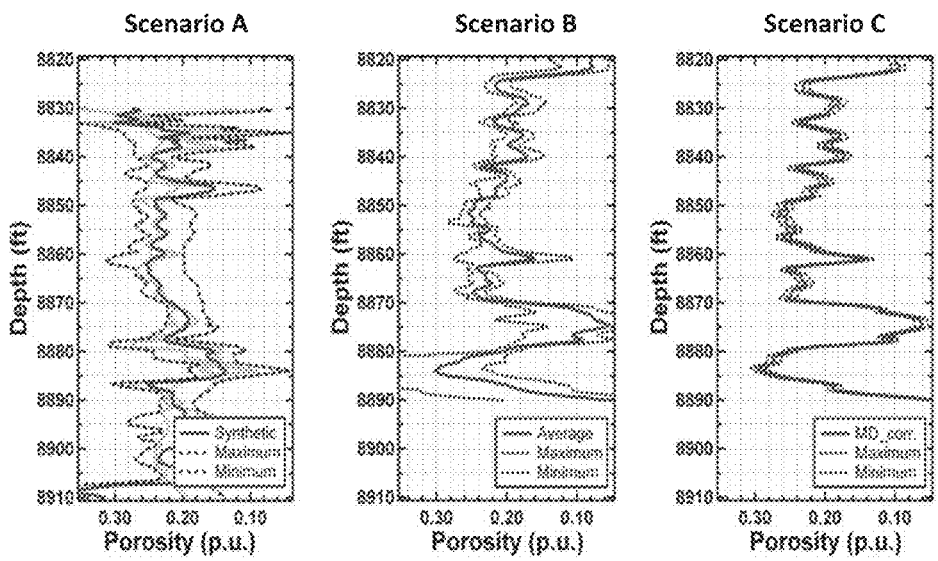

FIG. 10. LAYERS IDENTIFIED BASED ON POROSITY LOGS FOR EACH SCENARIO
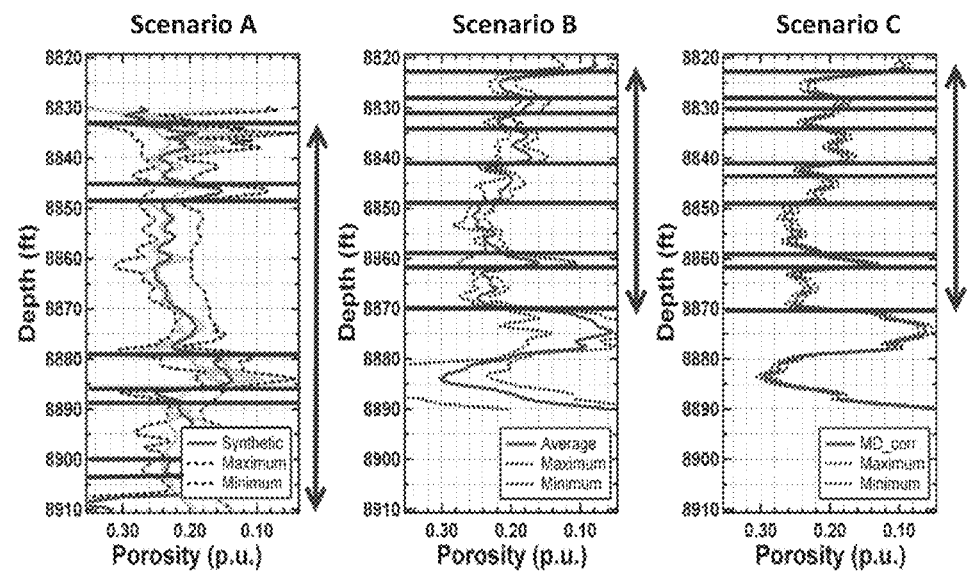
FIG. 11. PETROPHYSICAL PARAMETERIZATION OF RESERVOIR MODEL.
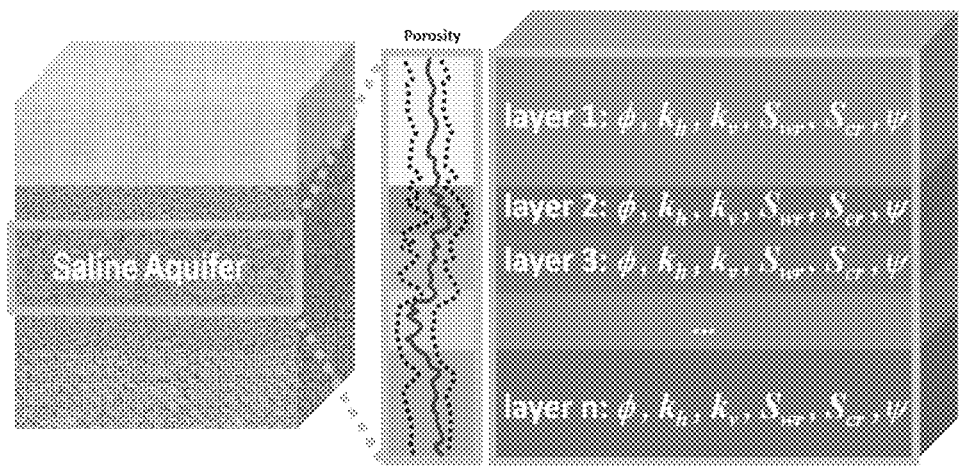

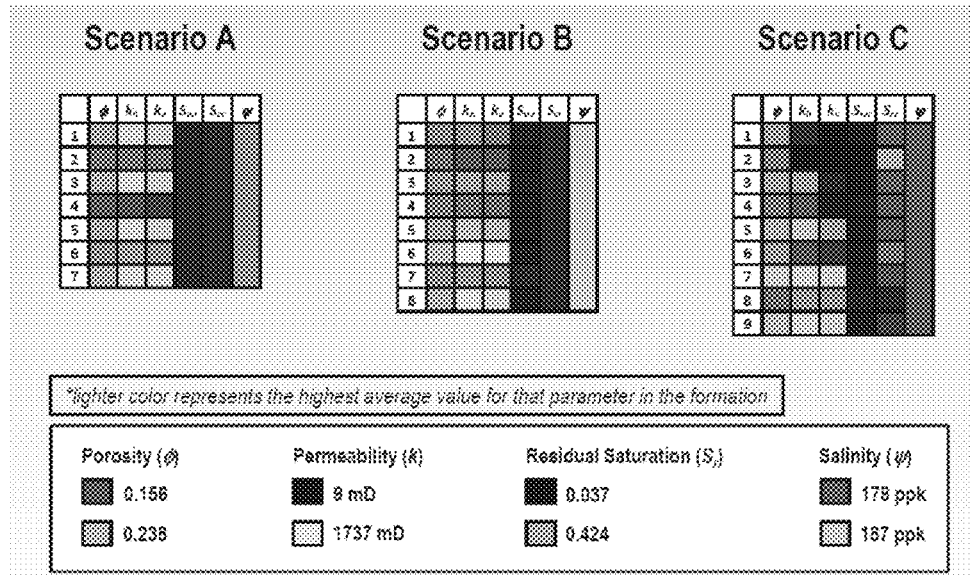
FIG. 12. RESERVOIR MODEL REPRESENTATION FOR SCENARIOS A, B, AND C
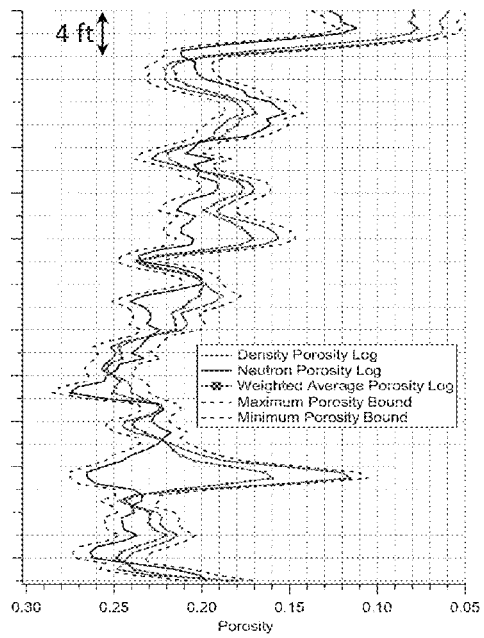
FIG. 13. EXAMPLE OF POROSITY LOGS WITH UNCERTAINTY QUANTIFICATION.

FIG. 14. EXAMPLE OF PERMEABILITY LOG REALIZATIONS.
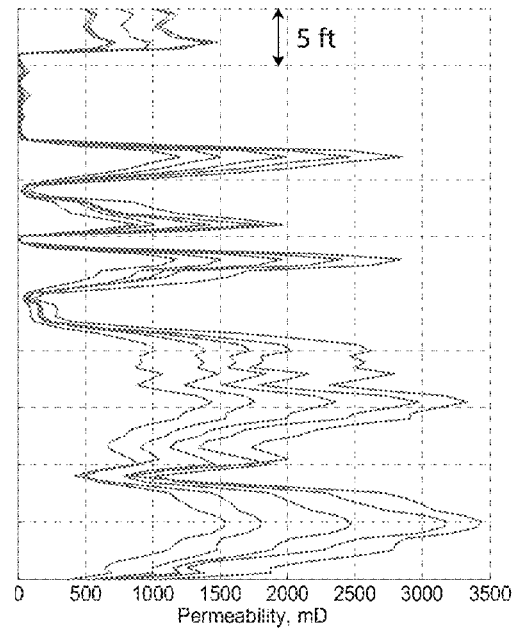
FIG. 15. EXAMPLE OF LOG REALIZATIONS FOR PRIMARY AND SECONDARY PARAMETERS
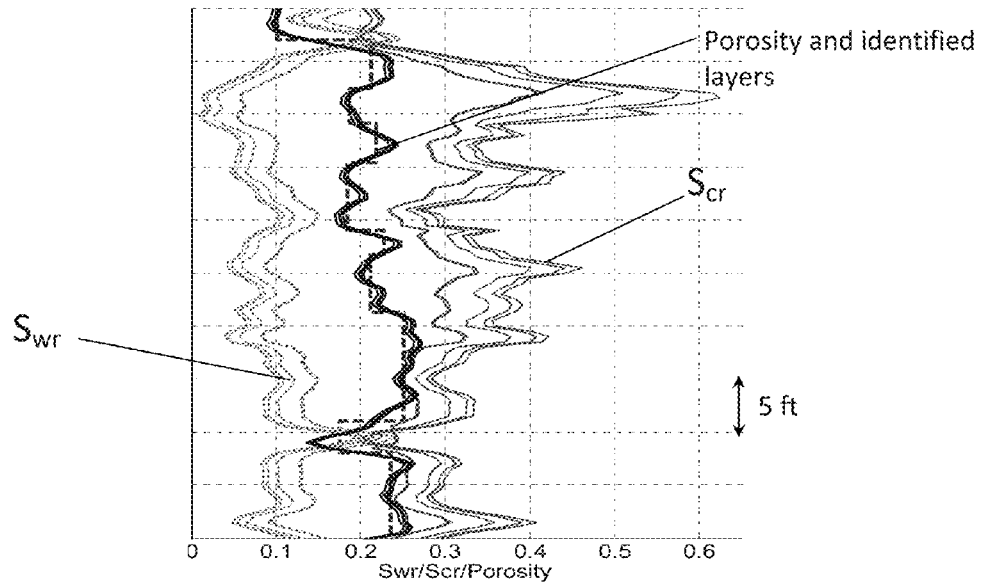

FIG. 16. ILLUSTRATION OF THE UNCERTAINTY QUANTIFICATION, PROPAGATION AND CHARACERIZATION.
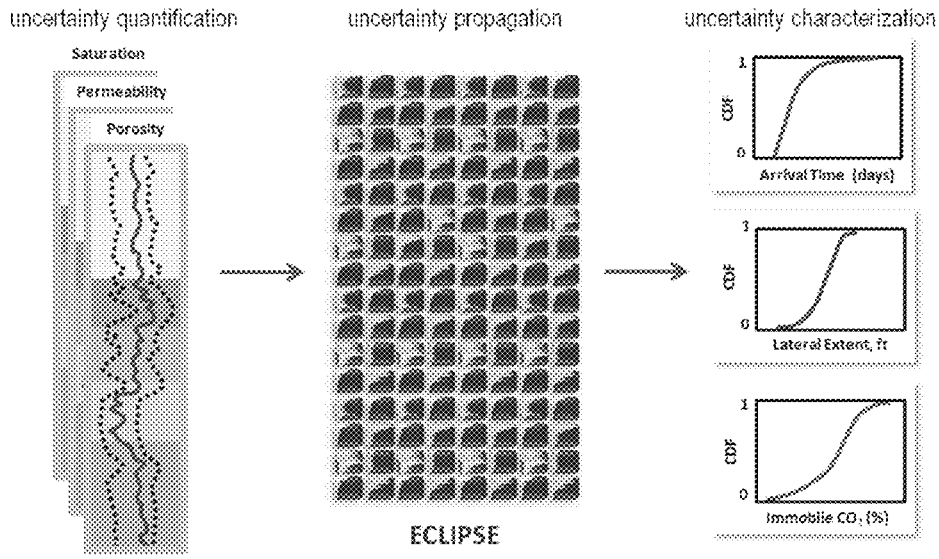
FIG. 17. EXAMPLE OF CDF FOR PERFORMANCE METRICS: SCENARIO A (AFTER 50 YEARS).
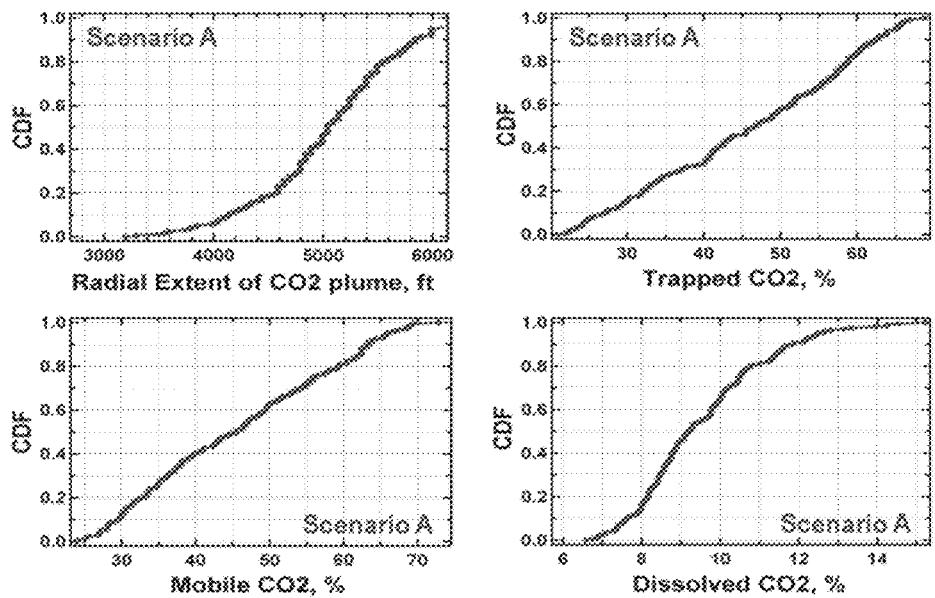

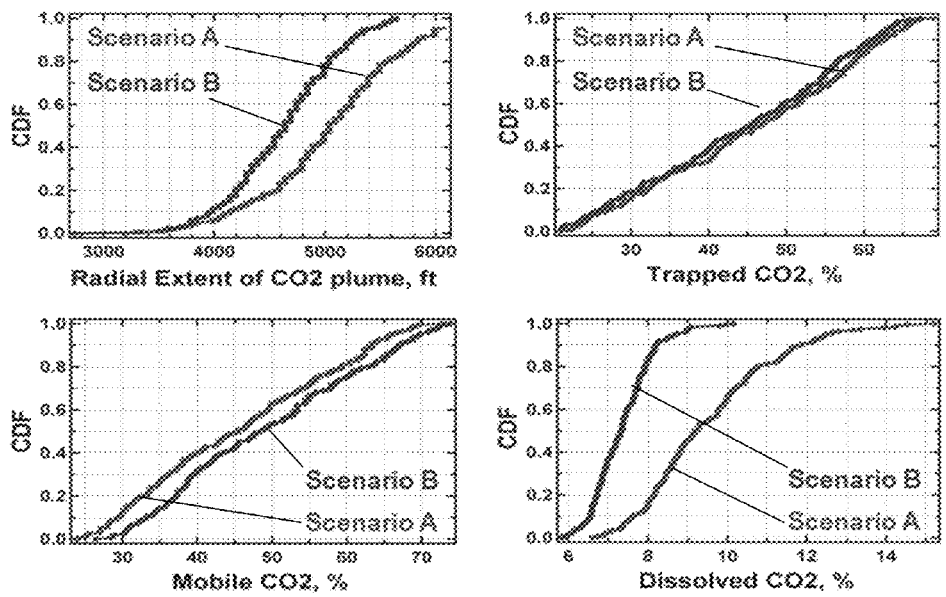
FIG. 18. EXAMPLE OF CDF FOR PERFORMANCE METRICS: SCENARIOS A AND B (AFTER 50 YEARS).
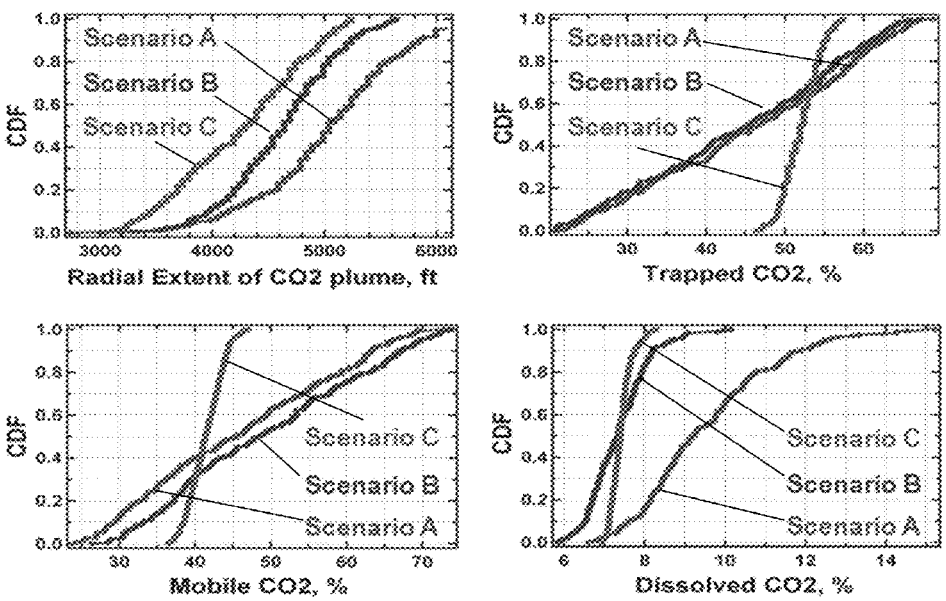
FIG. 19. EXAMPLE OF CDF FOR PERFORMANCE METRICS: SCENARIOS A, B AND C (AFTER 50 YEARS).

FIG. 20. TIME EVOLUTION OF THE PERFORMANCE METRIC (TRAPPED $CO_2$).
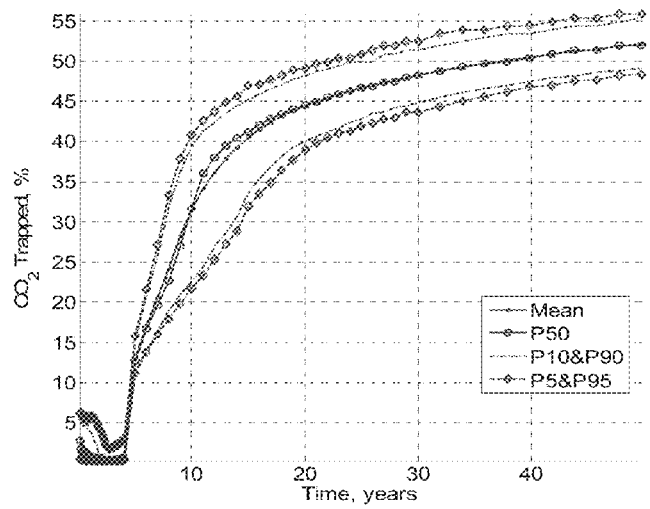
FIG. 21. EXAMPLE OF PROBABILITY CONTOUR PLOTS FOR LATERAL EXTENT OF $CO_2$ PLUME:
Probability that $CO_2$ plume ($S_{CO2}>0.05$) is contained within the contour.
1 Mt of $CO_2$ injected over 3 years; Time = 100 yrs
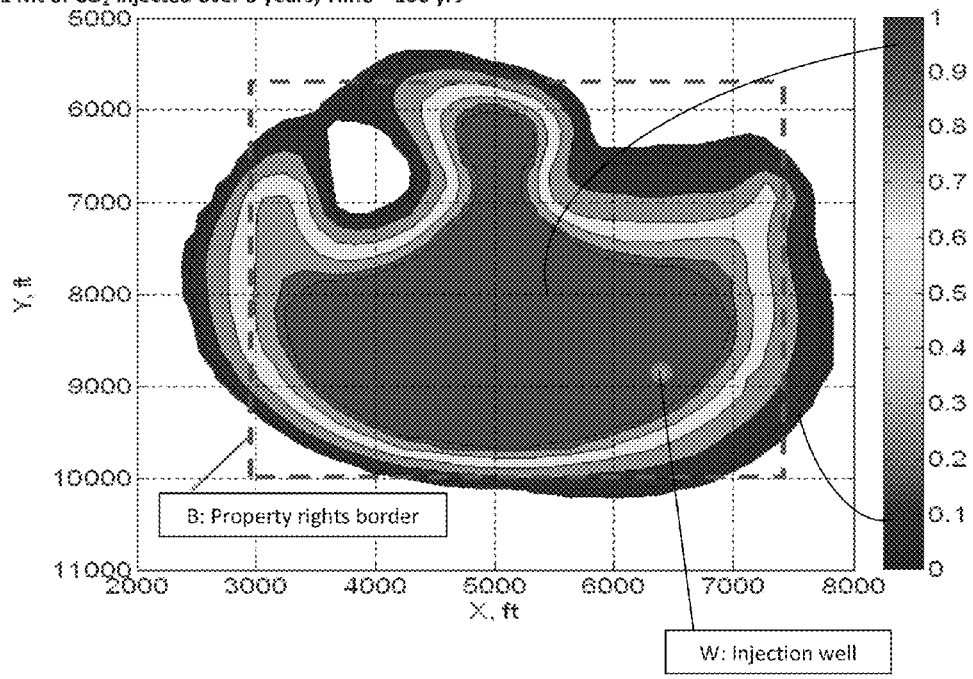

FIG. 22. PROBABILITY CONTOUR PLOTS FOR VERTICAL AND LATERAL EXTENT OF $CO_2$ PLUME:
Probability that $CO_2$ plume ($S_{CO2}$>0.05) is contained within the contour.
1 Mt of $CO_2$ injected over 3 years; Time = 30 yrs
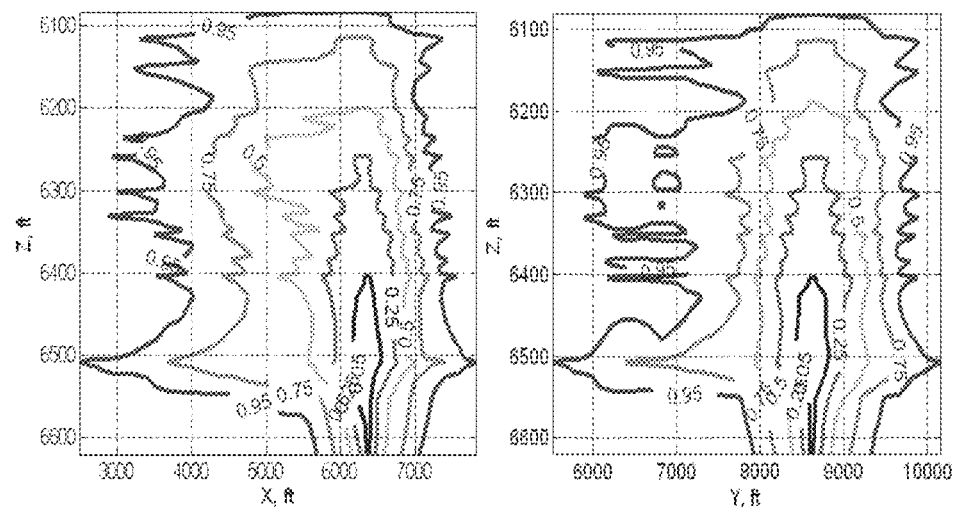
FIG. 23. FIRST-ORDER SENSITIVITY INDICES FROM GLOBAL SENSITIVITY ANALYSIS OF TRAPPED CO2 DURING THE LIFE OF THE PROJECT.
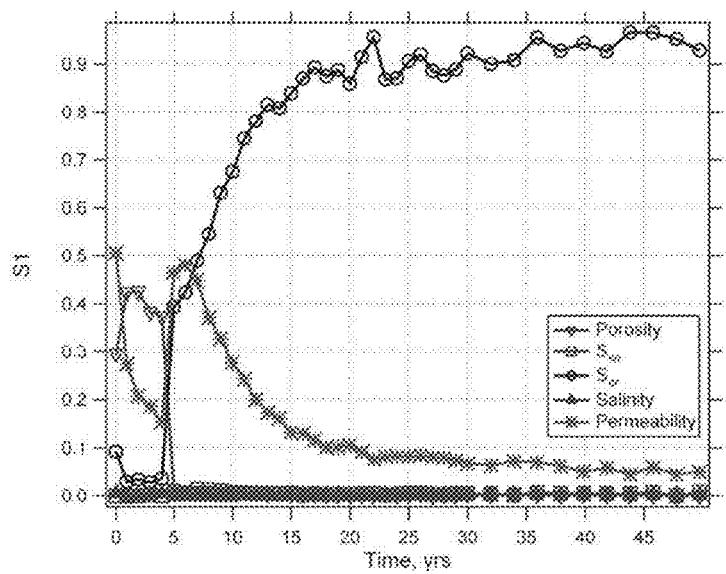

METHOD FOR UNCERTAINTY QUANTIFICATION IN THE PERFORMANCE AND RISK ASSESSMENT OF A CARBON DIOXIDE STORAGE SITE

CLAIM OF PRIORITY

This application claims priority from Ser. No. 61/173,025 filed Apr. 27, 2009, which is hereby incorporated by reference herein in its entirety.

FIELD OF THE INVENTION

This invention relates broadly to a method for formation parameter uncertainty propagation and quantification in the context of generating answer products relating to the storage of carbon dioxide within an underground formation. More particularly, this invention relates to a method for computing statistical measures of performance metrics related to containment, injectivity, and displacement characteristics of carbon dioxide linked to an underground formation targeted sequestration.

BACKGROUND OF THE INVENTION

Carbon dioxide ($CO_2$) geological storage is one of the approaches considered for stabilizing atmospheric $CO_2$ concentrations. Captured $CO_2$ from a source such as coal-fired power plant flue gas is injected through a well into the subsurface, e.g. saline aquifers, where it is likely to be at supercritical conditions. Once injected, $CO_2$ is expected to be geologically confined by impermeable layers overlaying the reservoir thereby enabling long-term (thousands of years) interactions to occur between water, minerals, and $CO_2$ to form solubilised $CO_2$, carbonic acid and immobile carbonates.

The volumetric storage capacity of saline aquifers has been determined to be quite large (See Holloway, S. "*An overview of the Joule II project: The underground disposal of carbon dioxide.*" Energy Conversion and Management, 38, p193-p198 (1997) and Gunter, W. D., Wong, S., Cheel, D. B. & Sjostrom, G. "*Large CO2 Sinks: Their role in the mitigation of greenhouse gases from an international, national (Canadian) and provincial (Alberta) perspective*". Applied Energy, 61, 209-227 (1998)); and it is thought to be between 20% and 500% of the cumulative worldwide projected $CO_2$ emissions through 2050 (See Davidson, J., Freud, P. & Smith, A. "*Putting Carbon Back in the ground*". IEA Greenhouse Gas R&D Program, February 2001). Therefore, with proper site selection and management, geological $CO_2$ storage may play a major role in reducing atmospheric $CO_2$ accumulation. However, several key issues need to be resolved before large-scale geological $CO_2$ sequestration becomes feasible. First, accurate predictions of the evolution of the spatial extent of the $CO_2$ are necessary for safe and secure storage site selection. Second, it is expected that continuous monitoring of the $CO_2$ plume within a saline aquifer resulting from injection may be required.

$CO_2$ displacement within a saline aquifer is governed by spatially varying parameters such as porosity, permeability and its anisotropy, and brine salinity. Additionally, saturation dependent properties affecting displacement are capillary pressure and relative permeabilities. The latter themselves are characterized by residual water and $CO_2$ saturations. Frequently, geological and petrophysical data proximate a well are unavailable, and as a result regional data are used to build synthetic site-specific geological horizons, and to provide petrophysical characterization. These synthetic data sets are usually obtained by interpolation between existing wells, e.g. kriging (See A. G. Journel and Ch. J. Huijbregts. "Mining Geostatistics", *The Blackburn Press,* 1978).

Predictive reservoir simulations, based upon which decisions are routinely made, are rarely definitive. More often than not, data are either sparse, or of such a low resolution and of a low information content that uncertainties in the outcomes must be estimated. For carbon sequestration, uncertainty quantification is even more important than in the oilfield because of potential requirements and anticipated regulations on containment. For example, failure to properly quantify the vertical movement of the $CO_2$ plume could result in leakage into the atmosphere or into potable water supplies. Similarly, failure to properly quantify the radial movement of the plume could result in movement into uncapped wells or into property that was not leased or acquired for sequestration.

Therefore, at every stage of a $CO_2$ sequestration project, performance and risk metrics such as containment, injectivity, and displacement efficiency, are important assessments that should be used in decision-making. To a large extent, expectations in performance metrics and their uncertainty quantification, depend on the petrophysical characterization of the storage site. Site characterization is normally conducted from the very early stages of the project and refined continuously as more data become available.

By nature, well-known geostatistical methods should rely upon large amounts of statistical information with regard to both single and multiphase flow properties of the rock within a given lithology. Unfortunately, whilst single-phase flow behavior may be estimated over large numbers of samples, multiphase flow properties are time consuming to acquire and are error prone even in the laboratory. Furthermore, procuring formation samples along a given lithology away from a wellbore is prohibitive.

It is for the above-mentioned reasons that it is important to have a reasonable basis for incorporating statistical inputs that are based on petrophysical sciences, and which honor log and seismic data within the context of their own measurement specifications. It is also desirable that these methods are able to construct two-phase flow properties and their statistical variation at all locations of relevance. Geostatistical methods are ill-suited for this purpose, because of i) unavailability of statistics away from the wellbore, and ii) impracticality of acquiring the data required to carry out predictive multiphase flow calculations. (See Busby D., Feraille M., Romani T., Touzani S. "*Method for evaluating an underground reservoir production scheme taking account of uncertainty*". U.S. Patent Application 2009/0043555 A1, see H. E. Klumpen, S. T. Raphael, R. I. Torrens, G. Nunez, W. J. Bailey, B. Couet, "*System and Method for Performing Oilfield Simulation*", U.S. Patent Application 2008/0133194 A1; see B. Raghuraman, B. Couet. "*Tools for decision-making in reservoir risk management*", U.S. Pat. No. 7,512,543, see I. Bradford, J. M. Cook, J. Fuller, W. D. Aldred, V. Gholkar. "*Method for updating an earth model using measurements gathered during borehole construction*", U.S. Pat. No. 6,766,254; and see T. A. Jones, S. J. Helwick, Jr. "*Method of generating 3-D geologic models incorporating geologic and geophysical constraints*", U.S. Pat. No. 5,838,634).

From the onset of a $CO_2$ sequestration project, a variety of metrics related to containment (or migration), displacement efficiency, and injectivity dictate decision-making. Expected values of the performance metrics and their variance need to be considered in the process, and a well-defined methodology is needed. The method of the invention overcomes the limitations of the prior art and provides an avenue for computing statistical measures of performance metrics related to containment and displacement characteristics.

SUMMARY OF THE INVENTION

According to one embodiment of the invention, a $CO_2$ sequestration site is evaluated by incorporating a consistent petrophysical framework having uncertainties expressed in the form of probability density functions of wellbore measurements, by systematically propagating the uncertainties to generate probability density functions or cumulative distribution functions of the parameters used in a reservoir simulation, by using reservoir simulation to thus transform the first set of parameters into output variables with uncertainties, and by using the output variables and uncertainties to generate an answer product from which uncertainty levels of performance metrics can be ascertained. For purposes herein, an "answer product" shall be defined as a graph, chart, plot, or other visual representation of a performance metric desirable in evaluating the suitability of a sequestration site, and showing uncertainty or probability information that permits such evaluation.

More particularly, and according to one aspect of the invention, a methodology is provided for uncertainty propagation and quantification for generating an answer product in the context of geological $CO_2$ storage. The procedure starts with the collection of all site-related, local, and regional geological, petrophysical, and geophysical data. These data are processed to create site-based depth logs for a plurality of petrophysical parameters. These depth logs are assigned uncertainty values based on their inherent physics of measurement, which in turn enables probability density functions (PDFs) and/or cumulative distribution functions (CDFs) for the parameters to be generated. Once PDFs and/or CDFs are constructed, multiple sets of values for the input data into a reservoir simulator may be realized for subsequent dynamic evaluation of the storage process. The reservoir simulator, through multiple runs, permits the generation of PDFs and/or CDFs for output variables having spatial and time dependencies such as $CO_2$ saturations, fluid pressures, and injection rates. In turn, the output variable PDFs and/or CDFs are used to derive PDFs and/or CDFs and corresponding quantiles that are used to ascertain uncertainty levels of performance metrics such as the spatial extent of the $CO_2$ plume and its shape, storage capacity, $CO_2$ leakage through cap-rock, percentages of dissolved and trapped carbon dioxide (for purposes herein, the terms "trapped", "residual" and "residually trapped" $CO_2$ are used interchangeably, as opposed to dissolved $CO_2$), etc. The PDFs and/or CDFs and corresponding quantiles for the performance metrics may be considered answer products, since they may be directly benchmarked against thresholds defined by project specifications and regulations.

According to one embodiment of the invention, where uncertainty remains above a threshold, a sensitivity analysis on the performance metrics can be used to identify the dominant petrophysical parameters affecting the uncertainty of the particular performance metric. Sensitivity indices are calculated and may be used to rank the influence of an input parameter on the performance metric's uncertainty. Additional tests (measurements) for more data for reducing uncertainty in the ranked petrophysical parameters can be identified so as to ultimately meet the specified thresholds. If the resulting uncertainty levels of the performance metrics still exceed specified thresholds, yet additional tests can be run.

According to one aspect of the invention, the collection of data involves multiple physical measurements obtained from the reservoir of interest, be it the well site or its geological environment. Single-well data allow description of heterogeneity along the wellbore trajectory. According to another aspect of the invention, the set of measurements may include data from the neighborhood wells and their variability (in the form of probability density functions). According to a further aspect of the invention, where available, the neighborhood well data may be interpolated to characterize intervening reservoir properties and their uncertainties. In sedimentary geological settings, along a given lithology, correlations are expected to be strong with random variations superimposed.

Advantageously, according to one aspect of the invention, the set of measurements may include basic well logs such as neutron-density, caliper, gamma-ray, array resistivity, and acoustic compressional and shear velocity. According to another aspect of the invention, the set of measurements may advantageously further include advanced well logs such as those of formation testers, elemental capture spectroscopy, nuclear magnetic resonance (NMR), core data, and packer interval pressure test. According to a further aspect of the invention, the data that such a basic well log or advanced well log is expected to yield and the impact of that data on the uncertainty of the dominant petrophysical parameters are useful in the sensitivity analysis conducted in one embodiment of the invention.

According to another aspect of the invention, the wellbore measurements along with their variability statistics are assimilated. In particular, relationships between the measurement variables and the petrophysical variables are collected, along with the uncertainty of the relationships. Additional functional relations between petrophysical quantities and those relevant to reservoir simulation along with their variability are specified. This may be carried out for every well.

According to a further aspect of the invention, in order to build a realization of a reservoir model, the first step is to carry out realizations for the most likely values of the input petrophysical parameters. Since reservoir simulators require finite grids, discretization is necessary. One or more petrophysical variables are picked with their most likely values along the wellbore trajectory to construct an optimal discrete layer model. For computational expedience, this layer geometry is accepted across all realizations—a reasonable assumption when variability is small compared to the differences in expected values for different layers. The number of layers is determined by satisfying an acceptable error in the property reconstruction of the layered model (which is limited when error reduction due to layer addition is inconsequential). Then a realization is carried out for each of the petrophysical variable of relevance to simulation, including derived quantities, so that the uncertainty of the relationships is automatically incorporated in the estimation. Homogenization of the layer properties is carried out in a physically and mathematically consistent manner.

If multiple wells are available, then realization at each well should obey correlation statistics for parameters of physical relationships used to compute petrophysical properties. As is often the case, if the correlation statistics are unavailable, well petrophysical log processing may be carried out as though each well is independent and then interpolated between wells using any of the established procedures. A simulation then generates one set of outcomes, and the procedure is repeated for building the statistical information of the outcomes.

According to one aspect of the invention, all of the uncertainties are propagated quantitatively in a petrophysical framework. Advantageously, measurements are treated such that inconsistencies in the inferred rock-fluid properties are avoided. In particular, since a multitude of well data may be used to estimate a petrophysical quantity, assignment of measures to data uncertainty allows inclusion of several inputs jointly according to their reliability or statistics. Advantageously, because of the enforced consistency, both measurement and rock model induced errors are included. Compact representations of the expectations and the distribution of outcomes are also provided.

Advantageously, according to the invention, saturation dependent hysteretic functions such as capillary pressure and relative permeabilities are used in propagating uncertainty in the reservoir model. These functions can be calculated, for example, based on the models by Land C. S., "*Calculation of Imbibition Relative Permeability for Two- and Three-phase flow from rock properties*", SPEJ, 8 (2), pp. 149-156 (1968); Ramakrishnan T. S. and Wasan D. T., "*Effect of capillary number on the relative permeability function for two phase flow in porous media*", Powder Technology, Vol. 48, pp. 99-124, (1986) and extended by (Ramakrishnan T. S. and Wilkinson D. J., "*Formation reducibility and fractional flow curves from radial resistivity variation caused by drilling fluid invasion*", Phys. Fluids, Vol. 9, No. 4, pp 833-844 (1997) for capillary pressure.

BRIEF DESCRIPTION OF THE DRAWINGS

The present invention is further explained in the detailed description that follows, in reference to the noted plurality of drawings by way of non-limiting examples of exemplary embodiments of the present invention.

FIG. 1 is a scenario-based uncertainty characterization workflow according to one embodiment of the invention.

FIG. 2 is a representation of the acquire data workflow step of FIG. 1.

FIG. 3 is a representation of the uncertainty quantification workflow step of FIG. 1;

FIG. 4 is a representation the uncertainty propagation workflow step of FIG. 1.

FIG. 5 is a representation of the uncertainty analysis workflow step of FIG. 1.

FIG. 6 is a representation having a map showing the test site location and neighboring wells, and porosity logs from the neighboring wells and a synthetic porosity log at the prospective test site location.

FIG. 7 is a representation of regional porosity-permeability correlation data.

FIG. 8 is a representation of porosity logs from three scenarios: Scenario A where no porosity log is taken at the test site; Scenario B where the test well is drilled and neutron-density, gamma ray, caliper, spontaneous potential, electromagnetic/array resistivity, and sonic logs are taken at the test site; and Scenario C where an elemental capture spectroscopy, NMR, borehole image, and fluid sample (MDT) logs are taken at the test site in addition to the Scenario B logs.

FIG. 9 is a representation of logs of the weighted average porosities resulting from the scenarios of FIG. 8 and showing uncertainty quantification.

FIG. 10 is a representation of how layers within the formation might be picked differently depending upon the scenario utilized.

FIG. 11 is a representation of inputs to the reservoir model.

FIG. 12 is a representation of how inputs to the reservoir model might vary depending upon the scenario;

FIG. 13 is a representation of porosity logs for Scenario B and showing how uncertainty bounds are determined.

FIG. 14 is a representation of permeability logs generated according to Scenario C.

FIG. 15 is a representation of logs of primary and secondary parameters generated according to Scenario C.

FIG. 16 is a representation of the parameter inputs into the reservoir model with their uncertainties, the uncertainty propagation of the reservoir model, and example performance metrics with uncertainty characterization.

FIG. 17 is a representation of Cumulative Distribution Functions for various performance metrics resulting from Scenario A.

FIG. 18 is a representation of Cumulative Distribution Functions for the performance metrics shown in FIG. 17 and resulting from Scenarios A and B.

FIG. 19 is a representation of Cumulative Distribution Functions for the performance metrics shown in FIG. 17 and resulting from Scenarios A, B and C.

FIG. 20 is a plot representing the time evolution of a performance metric (amount of trapped $CO_2$) during the life of the project.

FIG. 21 is a representation of a probability contour map of the lateral extent of a carbon dioxide plume at another test site location utilizing a 3D reservoir model.

FIG. 22 is a representation of probability contour plots for vertical and lateral extent of carbon dioxide plume generated in conjunction with the 3D reservoir model for the test site location used in generating FIG. 11.

FIG. 23 is a representation of the sensitivity indices for five input petrophysical parameters indicating their effect on the uncertainty of the trapped $CO_2$ during the life of the project.

It will be recognized by the person of ordinary skill in the art, given the benefit of this disclosure, that certain dimensions, features, components, and the like in the figures may have been enlarged, distorted or otherwise shown in a non-proportional or non-conventional manner to facilitate a better understanding of the technology disclosed herein.

DETAILED DESCRIPTION OF THE INVENTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

For purposes of clarity, the following terminology is used in the specification and the figures. $S_i$ (i=1, ..., $N_S$) is the current scenario or phase of the project. D represents all site specific data collected for characterization, e.g. raw log measurements, seismic surveys, core data, etc. $L_n$ (n=1, ..., $N_L$) refers to the processed data, generally depth indexed, obtained from the available measurement data D, after relevant environmental and noise corrections have been applied. $X_j$ (j=1, ..., $N_X$) denotes any input parameter (primary or secondary) that is normally required for site characterization and aquifer flow modeling. "Primary" parameters are a minimum subset of $\{X_j\}$ that can provide a complete petrophysical description of the reservoir, while "secondary" parameters are the complementary subset of $\{X_j\}$ that can be inferred from primary parameters. The distinction between primary and secondary parameters is not unique and generally depends on available data. Examples of $\{X_j\}$ are given by porosity, permeability, residual saturation, pore size distribution index, pore body to pore throat ratio, etc. $\tilde{X}_j$ (j=1, ..., $N_X$) is a vector of depth correlated values for parameter $X_j$, constructed from $L_n$ and generally considered to represent the most likely values for this parameter. $\tilde{X}_{j,r}$ (j=1, ..., $N_X$; r=1, ..., $N_r$) is the r-th realization of $\tilde{X}_j$ obtained from a sampling method, generally given as a depth indexed log or a 3D map. $Y_k$ (k=1, ..., $N_Y$) is an output variable obtained from a flow simulation run performed for a specific realization of the aquifer model. Output variables may include any scalar or vector quantity with spatial and time dependencies (e.g. pressure distribution map, injection rate, etc). $\Omega_m$ (m=1, ..., $N_\Omega$) denotes a performance metric for the $CO_2$ storage site that can be calculated for each realization based on the output variables $Y_k$ and if applicable, any other performance indicator obtained independently.

According to an embodiment of the invention, and as seen in FIG. 1, a method is provided to quantify, and if necessary, reduce the uncertainty of performance metrics associated with a $CO_2$ sequestration site. The main procedure shown in FIG. 1 provides an overview of the data flow from the onset of the project through its possible evolution until a decision can be made regarding the acceptability of the sequestration site for its intended use. Broadly stated, the procedure includes the acquisition of data, the use of the data to generate reservoir model input parameters having quantified uncertainty, propagation of the uncertainty through the reservoir model in the generation of output variables having uncertainty, and the analysis of the output variables and their uncertainties with respect to performance metrics in order to determine whether a decision can be made. If the uncertainty level is not acceptable, additional data may be obtained and the process repeated in order to reduce uncertainty for a decision to be made.

More particularly, the workflow of FIG. 1 commences with data acquisition; i.e., the collection at 110 of all site related regional and local geological, petrophysical, and geophysical data (D) for a first scenario. These are processed to create site based depth logs $\{L_n\}$ and $\{\tilde{X}_j\}$ as elaborated on hereinafter with respect to FIG. 2. These depth logs are further assigned uncertainty thresholds at 120 based on their inherent physics of measurement, which in turn enables the creation of PDFs and/or CDFs for the given parameters $\{X_j\}$, as elaborated on hereinafter with respect to FIG. 3. Once CDFs and/or PDFs of $\{X_j\}$ are generated, multiple realizations (i.e., sets) of $\{X_j\}$ in accordance with probability distributions can be introduced at 130 into a reservoir simulator. These realizations produce CDFs and/or PDFs of output parameters $\{Y_k\}$, as elaborated on hereinafter with respect to FIG. 4. The CDFs and/or PDFs of $\{Y_k\}$ are used to derive PDFs and/or CDFs and corresponding quantiles for $\{\Omega_m\}$ that are subsequently used at 140 to ascertain uncertainty levels of the performance metrics as described in more detail hereinafter with respect to FIG. 5. In accord with one aspect of the invention, compact representations of the expectations and the distribution of outcomes $\{Y_k\}$ and $\{\Omega_m\}$ to facilitate visualization of associated uncertainties may be considered answer products (see FIGS. 15-18). At this point, a decision must be made to determine if the uncertainty within the performance metrics meets specified thresholds. If at 145 the uncertainty meets the stated threshold, a decision (which may also be considered an answer product) can be made regarding the potential site and the next stage in development (if appropriate) can commence. Conversely, if the uncertainty remains above the threshold, a sensitivity analysis on the performance metrics is optionally used at 150 to identify the dominant petrophysical parameters (which may further be considered an answer product). Once sensitivity indices $I_s$ ($\Omega_m$, $X_j$) are composed, they can be ranked (another answer product) to identify at 160 the parameters that will reduce uncertainty in $\{\Omega_m\}$ the most, under given technical and economical constraints. More generally, at 170, decisions can be based on minimization of an aggregate objective function that includes all applicable costs and constraints. Further measurements are then taken, thereby adding data to the previously available data, and steps 110-145 are repeated for the new scenario. As will be appreciated by those skilled in the art, the workflow continues until an "acceptable" uncertainty level is met and a decision can be made at 175. The "acceptable" uncertainty level may lead to a decision (answer product) that the sequestration of carbon dioxide can proceed (i.e., it will with appropriate certainty be properly contained for the desired amount of time within a desired boundary). Alternatively, the decision may be that it is reasonably certain that the desired amount of carbon dioxide cannot be sequestered at the indicated site for any of many reasons.

Turning now to FIG. 2, the data acquisition workflow step 110 is shown in more detail. In particular, at 212 a comprehensive search is made for all local available data D for site characterization. This data may include, for example, core data, surface seismic data, and raw log measurements such as spontaneous potential (SP), caliper, gamma ray, neutron-density, resistivity, NMR, FMI (formation microimager), acoustic, fluid sampling, elemental capture spectroscopy, etc. At 214, raw data are processed and environmentally corrected to create at 216 depth-indexed logs of processed data $\{L_n\}$=f (D). These can be the in situ well measurements as well as regional parameters such as temperature or pressure of the given aquifer system. Then, at 218, for each local well, depth-based values for primary and secondary parameters $\{\tilde{X}_j\}$ are constructed. The specific vectors $\{\tilde{X}_j\}$ are not limited in construction from a single $L_n$, but can be and often are weighted averages of multiple logs $\{L_n\}$: $\tilde{X}_j = \Sigma \alpha_{jn} L_n$, $0 \leq \alpha_{jn} \leq 1$, $\Sigma \alpha_{jn} = 1$;

where $\alpha_{jn}$ is a predetermined weight for a specific $L_n$. More general nonlinear combinations of $L_n$ can also be used to calculate $\tilde{X}_j$. A subset of $\{\tilde{X}_j\}$ is then used at 220 to identify the reservoir zones (tops) of each well, and at 222 the reservoir zone locations (tops and bottoms) within all pertinent wells are correlated. At 224, a determination is made as to whether site-specific well data exists for a specific parameter $X_j$ other than those used above for zonal boundaries identification. If so, the uncertainty can be quantified at step 120. If it is found at 224 that for a certain site-specific parameter $X_j$ cannot be inferred from $\{L_n\}$, at 226, all regional data (including expert estimates) is compiled for that parameter. Then a synthetic $\tilde{X}_j$ may be constructed from multi-well data, preferably weighted by distance in the dip direction. Interpolation may also be performed by a variety of means, including kriging, least squares or polynomial interpolation. The uncertainty for that parameter may then be quantified at step 120.

According to one embodiment of the method, details of the uncertainty quantification at step 120 are seen in FIG. 3. Generally, and as seen at 320a, uncertainty quantification is accomplished by examination of the precision and accuracy of available data $\{D\}$ and hence $\{L_n\}$, and appreciating that any error associated with the calculated value of any particular parameter $X_j$ is directly related to the inherent physics of the measurements and the borehole environment in which the data was acquired, including measurement noise or scatter. This process is consistent for both the primary or directly measured reservoir parameters such as porosity, pressure and temperature, and the secondary parameters such as permeability and residual fluid saturations. For example, the previously described storage capacity metrics are extremely sensitive to residual saturations of water and $CO_2$. Residual water saturation, $S_{wr}$, can be determined from multiple $L_n$ or environmentally corrected inputs, such as clay volume derived from in situ elemental spectroscopy, nuclear density-porosity, or core measurements. Preferably, each measurement $L_n$, in this case, clay volume, has an intrinsic error that is expressed in the realization of $S_{wr}$. From the raw data measurements $\{D\}$ through the calculation of $\{L_n\}$ and reservoir parameters $\{X_j\}$, uncertainty is propagated through meticulous accounting and consistent accumulation of errors to concisely represent CDFs of $\{X_j\}$.

Furthermore, this process also propagates error from over-defined measurements, as best described with another example for porosity, which is a primary parameter. Here parameter $X_j$ is commonly a weighted function of several porosity logs contained in $\{L_n\}$. The intrinsic precision of each of the relevant $L_n$ varies by lithology, borehole environment, fluid saturations, and their effect on the physics of the measurement, be it sonic, neutron, or γ-ray (density) porosity. FIG. 8, as described in more detail hereinafter, illustrates typical environmentally corrected porosity inputs. Density porosity and neutron porosity are weighted by ⅔ and ⅓ respectively, to create, as seen in FIG. 9, the most likely values of formation porosity $\tilde{X}_j$ (320b of FIG. 3), with the maximum and minimum porosity bounds reflecting the lowest and highest porosity values that could exist given the error bounds of the inputs in $\{L_n\}$ at 320c. Once most likely values and error bounds for a given parameter are established, a probability density function (PDF) and/or a cumulative distribution function (CDF) for that parameter can be readily generated at 320d. The PDF can take any of many forms, such as uniform, Gaussian, triangular, etc. as discussed below with reference to FIG. 4.

FIG. 4 represents a preferred embodiment for the uncertainty propagation step 130 of FIG. 1 where the uncertainties in the parameter values are propagated through the simulation model. Uncertainty quantification has been traditionally performed by probabilistic methods, which proved to be sufficient in situations where uncertainty is purely aleatory (due to random variability of parameter behavior), as opposed to epistemic (See N. Chugunov, M. Sternin, G. Shepelyov. *"Probabilistic Methods for Uncertainty Quantification"*. In: Encyclopedia of Decision Making and Decision Support Technologies (Eds: F. Adam, P. Humphreys), Volume II. Idea Group Inc, UK, 2008, pp. 732-742). In the preferred embodiment, every input parameter is treated as a random variable defined on a certain interval by its probability distribution. As set forth above, there are numerous approaches for probabilistic uncertainty propagation (e.g. sampling-based: Monte-Carlo and Latin Hypercube Helton J.C., Davis F. J *"Latin hypercube sampling and the propagation of uncertainty in analyses of complex systems"*. Reliab. Eng. Syst. Saf. 81: 23-69. 2003; response surface models or surrogate models: See Box G. E. P., Draper N. R. *"Empirical Model-Building and Response Surfaces"*, Wiley Series in Probability and Statistics. 1987, etc.). Although any of the standard probabilistic approaches can be used in the disclosed workflow, a preferred embodiment for uncertainty propagation uses Latin Hypercube Sampling.

The Latin Hypercube Sampling (See R. L. Iman, J. C. Helton and J. E. Campbell, *"An approach to sensitivity analysis of computer models, Part 1. Introduction, input variable selection and preliminary variable assessment"*. Journal of Quality Technology 13 (3): 174-183 (1981); and Helton J. C., Davis F. J *"Latin hypercube sampling and the propagation of uncertainty in analyses of complex systems"*. Reliab. Eng. Syst. Saf. 81: 23-69, (2003)) generates realizations of reservoir parameters at each depth based on uncertainty of measurements and inferences. Using the sampled values, the reservoir model is populated, and uncertainty in the measurements is propagated to quantify uncertainty in the key performance metrics for the storage site: $CO_2$ plume extent and shape, storage capacity, $CO_2$ leakage through caprock, dissolved and trapped $CO_2$, etc. Furthermore, the proposed workflow utilizes all available data at every stage of site development in a petrophysically consistent manner to adequately address uncertainty in performance metrics. In the process of constructing a geological and petrophysical model at the injection site, we generally assume that reservoir properties such as porosity and permeability are homogeneous laterally away from the injection well. This assumption is often valid for large saline aquifers where correlation length in lateral directions is typically larger than that in the vertical direction by several orders of magnitude, hence it may be assumed that geologic variation occurs in the vertical direction only. Should more data become available, allowing lateral heterogeneity in the aquifer to be accounted for, reservoir properties can be refined through available geostatistical methods (See A. G. Journel and Ch. J. Huijbregts. *"Mining Geostatistics"*, The Blackburn Press, 1978.)

Workflow of FIG. 4 starts from step 410 where for every primary input parameter $X_j$ (as stated before, a subset of $\{X_j\}$), the realization of the log is generated using the PDF of $X_j$. Specifically, as set forth above with respect to 320c, for every depth z in the zone of interest, a PDF is generated or assigned for parameter $X_j$. Sampling one value of $X_j$ from these PDFs at every depth will provide a log realization for $X_j$ at 410. Based on the realization for the primary parameters, one can calculate realizations of the logs for the inferred or secondary parameters. For example, in one embodiment of the disclosed method, a realization of the permeability log is calculated based on NMR measurements, in particular critical spin-spin relaxation times $T_{2oc}$, and surface relaxivity ρ, using the approach disclosed in T. S. Ramakrishnan. "*Permeability determinations from nuclear magnetic resonance measurements*", U.S. Pat. No. 7,221,158, as illustrated in FIG. 14.

Once the realizations for $\{X_j\}$ are generated, a numerical model of the aquifer or reservoir is built at 420. This step may include the following substeps: (1) layer-picking based on the logs of primary parameters $\{X_j\}$; (2) calculating the values of transport properties for the layers picked (including porosity, vertical and horizontal permeabilities, residual saturations, etc.; and (3) calculating relative permeability and capillary pressure curves based on pore-level physics models. In a simplified version substep (1) may be performed with the most likely realization of the parameters $\{\tilde{X}_j\}$ to build a numerical model of the aquifer that will be used for all realizations of parameters $\{X_j\}$ thereafter.

To ensure continuity of $X_j$ with respect to depth of measurement, a sampling approach may be used that would assume absolute correlation for the $X_j$ values within certain zones (or for the whole zone of interest). The justification for this approach lies in the assumption that within a sedimentary lithology, property continuity is expected.

Although the above discussion is focused on the generation of depth indexed realizations for each parameter, i.e. in the form of logs, it may naturally be extended to the generation of 3D realization maps for each $X_j$. In the case where available data allow spatial variability to be accounted for, geostatistical methods are commonly applied. The uncertainty quantification step mentioned earlier should include calculation of variograms and all relevant statistical descriptions of spatial continuity in $\{X_j\}$ (See A. G. Journel and Ch. J. Huijbregts. "*Mining Geostatistics*", The Blackburn Press, 1978). Training images may also be included if multipoint geostatistics are to be used. Each realization map $\tilde{X}_{j,r}$ is typically generated using stochastic simulation. As an example, kriging-based sequential simulation is a common technique implemented in most commercially available geostatistical tools, e.g. in PETREL (a trademark of Schlumberger). In the second step of the workflow, as a part of the reservoir model construction, upscaling is desirable in order to reduce the geological model down to a reasonable size for use in a flow simulator (L. J. Durlofsky. "*Upscaling of geocellular models for reservoir flow simulation: a review of recent progress*", Proceedings of the 7th International Forum on Reservoir Simulation, Buhl/Baden-Baden, Germany, Jun. 23-27 2003). The choice of the upscaling technique is expected to depend on the nature of each parameter $X_j$. For example, upscaling for porosity is typically based on simple volume averaging, whereas permeability may be upscaled using a power averaging procedure. Another commonly used approach for permeability is based on local numerical computations of fine-scale pressure distributions from which global flow transmissibilities can be obtained. Upscaling procedures are also defined for two-phase flow properties, such as relative permeabilities, residual saturations and capillary pressure. All of these procedures introduce errors that should be checked at least with a fine grid base case simulation.

Once the numerical model for the aquifer is built, at 430, a flow simulation for the generated realization of $\{X_j\}$ is run. This can be done using a commercial flow simulator such as ECLIPSE (a trademark of Schlumberger). Here uncertainty propagation is based on the grid-converged original flow model. The output variables $\{Y_k\}$ from the flow simulation are post-processed at 440. The outputs may include spatially and temporally distributed quantities such as fluid phase saturations, pressures, and brine salinity. $\{Y_k\}$ may also include scalar quantities and their time evolution such as injection pressure, injection rate, etc. Based on the outputs $\{Y_k\}$ of the flow simulation, values of performance metrics $\{\Omega_m\}$ identified at the beginning of the analysis are calculated. Performance metrics may include the following quantities: lateral extent of the plume (capacity); leakage rate from the intended storage interval to another zone (containment); injection rate and injection pressure; $CO_2$ arrival time to monitoring location(s); total amount of dissolved and trapped $CO_2$; pressure at monitoring location(s); and financial indicators for the project (e.g., net present value, return on investment, etc.). The calculated values of performance metrics $\{\Omega_m\}$ are stored in the digital data storage device or in the computer memory for every realization of $\{X_j\}$.

Steps 410 through 440 are repeated until the number of the simulated realizations is equal to the predefined number $N_r$ at 450, or until there is a convergence in the PDFs or CDFs of $\{\Omega_m\}$. The number is expected to be reasonably large (>100) to obtain a comprehensive characterization of uncertainty in the input parameter space. When the number of realizations reaches $N_r$ or upon convergence, the calculated values of the performance metrics are passed to step 140 (FIG. 1) where uncertainty of the performance metrics is analyzed and answer products provided. As will be described hereinafter, the answer products may take the form of compact representations of the expectations and the distribution of outcomes $\{Y_k\}$ and $\{\Omega_m\}$ in order to facilitate the visualization of associated uncertainties (see FIGS. 17-22).

As previously described, the uncertainty analysis of step 140 is passed to a decision step 145 and then a sensitivity analysis step 150, the step of identifying the input parameters to improve the uncertainty characterization 160, and the identification of desired measurements (i.e., the next scenario (Scenario $S_{i+1}$)) based on technical and economic constraints at 170, all of which may be considered together as part of an uncertainty analysis, and each of which may be said to provide answer products.

Details of uncertainty analysis of steps 140, 145, 150 and 160 of FIG. 1 are seen in FIG. 5. The main purpose of workflow represented in FIG. 5 is to determine the level of uncertainty in the estimates of $\Omega_m$ and if necessary to perform a sensitivity analysis to identify the most influential petrophysical properties. Once the petrophysical properties $X_j$ of interest are identified, the corresponding direct or indirect measurements $\{M\}$ are selected based on their ability to reduce uncertainty in $X_j$ and hence improve estimation of uncertainty in $\Omega_m$. Economical considerations can also be taken into account when selecting the measurements $\{M\}$.

The uncertainty analysis starts with step 510 (see FIG. 5) by generating cumulative probability functions (CDFs) and/or PDFs for performance metrics $\Omega_m$ based on the results of uncertainty propagation step 130 (see FIG. 1). Environmental regulations or project goals may require estimation of specific quantiles for some performance metrics. The quantiles can be estimated from CDFs of $\Omega_m$ at step 520. For example, a P95 (95% probability) quantile for the total amount of residual $CO_2$ after 50 years can be shown as a plot (FIG. 20). The threshold values for these quantiles may be set by the regulations. If the uncertainty level of the estimate for a performance metric $\Omega_m$ is acceptable at 545 (145), there is no need for further analysis to enable a decision 575 (175). Otherwise, the proposed method to reduce uncertainty in $\Omega_m$ or its quantile is followed.

There are numerous methods available for sensitivity analysis ranging from scatter plots, linear correlation, and Spearman rank correlation to global sensitivity analysis (See Saltelli A. Tarantola S., Campolongo, F. and Ratto, M., *Sensitivity Analysis in Practice. A Guide to Assessing Scientific*

*Models*, John Wiley & Sons publishers (2004); Sobol I. M. "*Global sensitivity indices for nonlinear mathematical models and their Monte Carlo estimates*". Math Comput Simul 55:271-280; (2001)). Any of these approaches can be used to quantify effects of input petrophysical parameters $X_j$ on performance metrics $\Omega_m$. In a preferred embodiment, the disclosed method uses global sensitivity indices $I_s(\Omega_m, X_j)$ as a measure of the effect that uncertainty in parameter $X_j$ has on the uncertainty of the performance metric $\Omega_m$. According to the proposed method, the sensitivity indices $I_s(\Omega_m, X_j)$ are calculated at step 550 (150).

The next step 560 (160) of the algorithm involves ranking of input petrophysical parameters $X_j$ according to their sensitivity indices $I_s(\Omega_m, X_j)$ for given performance metric $\Omega_m$. A ranking $R(\Omega_m, X_j)$ is used to identify the measurements {M} for the next scenario 170. In the preferred embodiment, the set of recommended measurements can be obtained as a solution to M=arg min $F(C_1(M), C_2(V(\Omega)))$, an optimization problem, where $C_1(M)$ is a vector representing cost associated with measurement M, $C_2(V(\Omega))$ is a vector representing cost associated with large variability in $\Omega$ (risk), and F is the aggregate cost function. Alternatively one can minimize uncertainty in $\Omega$ under a cost constraint due to measurements, or minimize the cost of the measurement program while keeping uncertainty in $\Omega$ below a specific threshold. The identified set of measurements M is passed to the next scenario $S_{i+1}$ and the analysis continues according to FIG. 1.

According to one aspect of the invention, the global sensitivity analysis 550 is based on the Analysis of Variance (ANOVA) approach (Archer et al, "ANOVA-like Techniques and the Use of Bootstrap", *J. Statist. Comput. Simul.*, Vol 58, pp. 99-120, 1997, which is hereby incorporated by reference herein in its entirety). The uncertainty in the prediction of the performance metric $\Omega_m$ is characterized by its variance $V(\Omega_m)$. The idea of the ANOVA approach is to estimate the contribution to $V(\Omega_m)$ due to the uncertainties in the input parameters $\{X_i\}$ which are in turn characterized by their respective variances $V(X_i)$.

In case of independent $\{X_i\}$, the Sobol' decomposition (Sobol, "Sensitivity estimates for nonlinear mathematical models", *Math. Modeling & Comp. Exp.* 1, pp. 407-414, 1993 which is hereby incorporated by reference herein in its entirety) can be used to represent $V(\Omega_m)$ as $$V(\Omega_m) = \Sigma V_i + \Sigma_{1 \leq i < j \leq Np} V_{ij} + \ldots V_{12\ldots Np}, \quad (1)$$

where $V_i = V(E(\Omega_m|X_i))$ are the first-order contributions to the total variance $V(\Omega_m)$. Those skilled in the art will appreciate that $V_i$ is the variance of conditional expectation of the performance metric $\Omega_m$ when $X_i$ is fixed while all other parameters $X_{-i}$, are varying. Since the true value of $X_i$ is not known a priori, the expected value of $\Omega_m$ is examined when $X_i$ is fixed anywhere within its possible range, while the rest of the input parameters $X_{-i}$ are varied according to their original probability distributions. Thus, $S1_i = V(E(\Omega_m|X_i))/V(\Omega_m)$ is an estimate of reduction in the total variance of $\Omega_m$ if the variance in $X_i$ is reduced to zero. Similarly, $V_{ij} = V(E(\Omega_m|X_i, X_j)) - V_i - V_j$ is the second-order contribution to the total variance $V(\Omega_m)$ due to interaction between $X_i$ and $X_j$. It should be appreciated that the estimate of variance when both $X_i$ and $X_j$ are fixed simultaneously should be corrected for individual contributions $V_i$ and $V_j$.

For linear models $\Omega_m(X)$, the sum of all first-order effects $S1_i$ is equal to 1. This is not the case for the general case of non-linear models, where second-, third- and higher order effects (interactions between 2, 3 or more input parameters) play an important role. The contribution due to higher-order effects can be estimated via a total sensitivity index $ST_i = (V(\Omega_m) - V(E(\Omega_m|X_{-i})))/V(\Omega_m)$, where $V(\Omega_m) - V(E(\Omega_m|X_{-i}))$ is the total variance contribution from all terms in decomposition of $V(\Omega_m)$ that include $X_i$. Obviously, $ST_i \geq S1_i$, and the difference between the two represents the contribution from the higher-order interaction effects that include $X_i$.

There are several methods available to estimate $S1_i$ and $ST_i$ (see A. Saltelli, M. Ratto, T. Andres, F. Campolongo, J. Cariboni, D. Gatelli, M. Saisana, S. Tarantola. *Global Sensitivity Analysis: The Primer*. Wiley-Interscience; (2008), which is hereby incorporated by reference herein in its entirety).

Global sensitivity analysis as described above can be applied to the model-based prediction of any performance metric at any time during the life of a project. According to one aspect of the invention, global sensitivity analysis is conducted by identifying the performance metric of interest $\Omega_m$, identifying a specific time during the life of the project to estimate $\Omega_m$, calculating global sensitivity indexes $I_s(X_i, \Omega_m)$ for every input parameter $X_i$ with respect to $\Omega_m$. In one embodiment, $I_s$ is the first-order Sobol' sensitivity index $S1_i = V(E(\Omega_m|X_i))/V(\Omega_m)$. After the global sensitivity indexes are calculated, the input parameters may be ranked at 560 with respect to the calculated sensitivity indexes $I_s(X_i, \Omega_m)$. The measurements {M} reducing uncertainty in identified parameters $X_i$ can then be ranked according to $I_s(X_i, \Omega_m)$. According to one aspect of the invention, the specific set of recommended measurements {M} can be obtained at 170 by minimizing the aggregate cost function $F(C_1(M), C_2(V(\Omega_m)))$ that includes the cost associated with the measurement M and the cost associated with variability in the estimate of $\Omega_m$. At that point, a decision (not shown) may be made whether to proceed with one or more additional measurements. As an example, if a well has not been drilled at the sequestration site, a well can be drilled, and logs such as one or more of a neutron-density log, a gamma ray log, an array resistivity log, a spontaneous potential log, etc. may be conducted. Depending upon the determination at 170, for scenario $S_2$ only a neutron-density log (as measurements {M}) might be carried out at step 110. Then, after stepping through steps 120, 130, and 140, a determination is made at step 145 for scenario $S_2$ as to whether the uncertainty level for the performance metrics is acceptable. If yes, a decision is made at step 175. If not, the sensitivity analysis is conducted at steps 150, 160, 170 to identify one or more additional logs which may be conducted as measurements {M} for scenario $S_3$. The method of the invention continues by continuing with steps 110-145 and steps 150-170, until the uncertainty level is determined at step 145 to be acceptable for making a decision, or until a decision is made not to invest additional funds into additional measurements.

As another example, it is very possible that even if a well has been drilled at the sequestration location, and certain data from logs such as a neutron-density log, a gamma ray log, an array resistivity log, and spontaneous potential log are available, the uncertainty level at step 145 may still be unacceptable. In that case, measurements from one or more "advanced" logs such as NMR and elemental capture spectroscopy logs, borehole image logs, etc. may be indicated based on the sensitivity analysis. Again, according to the method of the invention, provided a decision is made to proceed, the new measurements are made, the data are gathered, and a new scenario is run. The process continues until the uncertainty level is considered acceptable such that a decision can be made in one direction or another at step 175, or until a decision is made to stop the project by not conducting additional measurements.

While it is generally expected that additional measurements will reduce the uncertainty level for the performance metrics, it should be appreciated that under certain circumstances, the opposite might occur. In particular, if additional measurements provide unexpected data that calls into question the model (e.g., indicates that the identified layers are incorrect and that there are more or fewer layers), it is possible that the uncertainty level will increase. In such a situation, it may be necessary at step 130 to revise the simulation model in order to reach an outcome where an informed decision can be made.

The methods of the invention have been tested during the site characterization phase for a proposed storage location in Jackson County, Mississippi. An injection of 400,000 tonnes of $CO_2$ into the Dantzler formation at this location had been proposed. The location of the proposed storage site is indicated in the map at the bottom of FIG. 6. The Dantzler Formation is found in the Lower series of the Cretaceous system and includes a saline reservoir which might be ideal for $CO_2$ sequestration.

In order to test the methods of the invention, three scenarios were considered. A first scenario (Scenario A) represents a scenario where only regional data and logs from surrounding wells were available. A second scenario (Scenario B) represents a scenario where basic logs such as caliper (borehole radius), gamma ray, array resistivity, neutron-density, and spontaneous potential logs have been conducted at a test well. A third scenario (Scenario C) is one where the advanced logs in addition to those of Scenario B are available. The advanced measurements include an elemental capture spectroscopy, NMR, borehole images, and sampled fluid characterization.

Scenario A is represented in FIG. 6, where two wells adjacent to the proposed injection site are shown on the map. In acquiring data (step 110 of FIG. 1), porosity, bulk density (RHOB) and gamma ray (GR) logs for about 100 feet of corresponding portions of each neighboring well as shown were used, it being noted that a dip between the wells causes the layers from 8820-8920 feet of the Well 1 to correspond to the layers from 9250-9350 feet of the Well 2. From the data, a synthetic expected-porosity log (mean) was generated for the test well. Uncertainty was quantified (compare the mean with the min and max logs) according to step 120 of FIG. 1.

More detail regarding the generation of the synthetic porosity log with quantified uncertainty is seen with reference to FIG. 8 and FIG. 9. In FIG. 8, porosity estimates of Scenario A are on the left hand side. The estimates are obtained from the gamma-ray density ("density") logs, neutron-porosity ("neutron") logs, and sonic logs with two different processing at the neighboring wells, from which a weighted average synthetic log was generated. The weights are inversely proportional to the distance along the dip from the test well to the well for which the log was acquired. Likewise, the left hand side of FIG. 9 shows the synthetic porosity log with the maximum and minimum values for Scenario A.

Similar logs for porosity are shown in FIGS. 8 and 9 for both Scenarios B and C. In Scenario B, the porosity values generated from the data gathered from running neutron and density tools in the test well is plotted, and the weighted average of the two is shown in the middle of FIG. 8. The minimum and maximum values for porosity in Scenario B were calculated by adjusting the minimum and maximum values from the two available porosity logs by 1 p.u., a common error specification for such family of the tools (See FIG. 13). In the middle of FIG. 9, the average and the uncertainty represented by the maximum and minimum porosity values are depicted. Comparing Scenario B with Scenario A in FIG. 9, it will be appreciated that the uncertainty regarding the porosity is reduced significantly.

On the right hand side of FIG. 8, Scenario C is shown with a third representation of porosity which is derived from an elemental capture spectroscopy (MD_corr.). The right hand side of FIG. 9 shows the MD_corr log with maximum and minimum porosity values logs. As will be appreciated by comparing Scenario C of FIG. 9 with Scenario B of FIG. 9, the uncertainty with respect to the porosity has been reduced significantly by running the elemental capture spectroscopy log which reduces the uncertainty of the matrix density and enables us to obtain a better estimate of porosity than from the neutron and density logs alone.

As was previously described with reference to FIG. 4, in order to build the aquifer/reservoir model it was necessary to identify the layers in the formation of interest. The layers shown in FIG. 10, were identified from the average porosity logs of FIG. 9. In Scenario A, where the porosity information has more uncertainty, seven layers were identified based on the synthetic porosity log, and the reservoir top and bottom (step 222 of FIG. 2) were determined to be at well depths of 8833 ft and 8903 ft respectively. As previously noted, in Scenario A, this information is based completely on the data obtained from neighboring wells. In Scenario B, with the data taken from logs at the test well itself, eight layers were identified based on the weighted average porosity log, the reservoir top and bottom being well depths of 8822 and 8870 ft respectively. The eight layers are differently located than the seven layers of Scenario A. In Scenario C where more advanced logs were run, the reservoir top and bottom were located identically to that of Scenario B, but a ninth layer was identified based on environmentally corrected porosity log (MD_corr.), and some of the layers were differently situated relative to Scenario B.

For each layer of a particular scenario, to enable dynamic description, the reservoir model requires seven inputs: porosity $\phi$, horizontal permeability $k_h$, vertical permeability $k_v$, residual water saturation $S_{wr}$, residual carbon-dioxide saturation $S_{cr}$, and salinity $\psi$. FIG. 11 is a representation of inputs to the reservoir model for n layers. As will be discussed hereinafter with reference to FIG. 16, the reservoir model will be run hundreds of times with different input parameter values for each of the n layers so that the uncertainty associated with the input parameter values can be propagated through the reservoir model.

In building the model at step 420, the procedure for input parameter calculation for each scenario can differ. Thus, as seen in FIG. 12. for Scenario A, only seven formation layers are shown. The porosity inputs (a primary parameter) for Scenario A for each layer are determined from the neighboring wells' porosity logs (FIG. 9) by sampling from the PDF defined between the maximum and minimum possible values (FIG. 10) for each layer. For Scenario A, in the absence of other information, a uniform distribution was used in the sampling. The horizontal and vertical permeabilities for Scenario A are generated from the sampled porosity values (by using cross-plots of porosity and permeability (FIG. 7) and scaling rules for flow along the beds and perpendicular to the beds) and are therefore secondary parameters which vary layer by layer. The residual water saturation and the residual carbon-dioxide saturation for the layers are taken from regional data as primary parameters which do not vary layer by layer. In both cases, a uniform PDF was used to generate realizations for $S_{wr}$ and $S_{cr}$ in Scenario A. Finally, the salinity is taken from the neighboring wells as a primary parameter which does not vary over the identified layer and for given realization at 410 the same salinity value is applied to all layers of the reservoir model. For all parameters (and at all layers), the average values for the layers are shown in gray scale in FIG. 12. However, the multiple input values for each parameter for each layer will be generated by sampling from the PDF defined between the maximum and minimum possible values for that parameter for that layer as discussed hereinafter with reference to FIG. 16

In Scenario B, the reservoir model receives data for eight layers. The primary parameter porosity is sampled using triangular PDF defined between minimum and maximum values and with modal value at the weighted average porosity log (FIG. 13). The secondary parameters of horizontal and vertical permeability are derived using the sampled value of porosity from the regional porosity-permeability correlation data shown in FIG. 7. Calculating $k_v$ and $k_h$ for each layer is done as before for Scenario A. Because the porosity data of Scenario B are different from the porosity data of Scenario A, not only are the indicated input porosity values different, but so are the permeability values. In Scenario B, the residual water saturation is obtained as a secondary parameter from the volume of clay measured by the sonic and neutron density tools run in the test well. Once a realization for volume of clay log is generated, the $S_{wr}$ log can be calculated, which is then used to determine $S_{wr}$ value for each layer of the reservoir model. The residual carbon-dioxide saturation, on the other hand, is estimated from regional data (as in Scenario A) and therefore does not vary from layer to layer for a given realization. The salinity information is inferred from an electromagnetic log and porosity. A Gaussian PDF was assumed for salinity values in Scenario B.

Because additional log information from diverse tools is available in Scenario C, the inputs for the nine layers of Scenario C are based on the most extensive physical measurements. The porosity is sampled from Gaussian distribution with a mean at MD_corr (FIG. 9) and the corresponding value is then calculated for each layer by averaging the generated porosity log within the layer. The permeabilities are derived from the NMR tool rather than from a porosity correlation. More particularly, FIG. 14 shows permeability log realizations calculated based on NMR log. For a given realization of the permeability log, scaled horizontal and vertical permeabilities can be generated as explained for Scenario A and B. Thus, the permeability values for the layers in FIG. 9 are taken from the vertically averaged permeabilities determined from the data contained in FIG. 14. FIG. 15 shows residual water and carbon dioxide saturations (along with the average porosity shown layer by layer), calculated as secondary parameters from the NMR tool. As a result of the additional information, in FIG. 12, the average values are shown to vary layer by layer. It is noted that the carbon dioxide saturation may be determined more directly from core samples. Finally, the salinity is taken from a single fluid sample data obtained by a formation sampling tool.

Generated with the input parameter values are uncertainties. Clearly, where there is no direct data, the uncertainties are expected to be larger than when there is direct data. Thus, the uncertainties associated with porosity and hence horizontal and vertical permeabilities for Scenario A are expected to be larger than the uncertainties associated with porosity and horizontal and vertical permeabilities of Scenario B (compare porosity uncertainties in FIG. 9). Similarly, in Scenario B, since the residual water saturation and the salinity are derived from measurements made at the test well, the uncertainties in the residual water saturation and the salinity are expected to be smaller than that of Scenario A where values are taken from regional data or from neighboring wells. Likewise, the uncertainties associated with all of the parameter inputs of Scenario C will tend to be smaller than those of Scenarios B and A.

FIG. 16 is a representation of the reservoir model parameters and their uncertainties on the left hand side. They are inputs into the reservoir model in accord with step 130. Using PDFs or CDFs of each parameter based on their uncertainties (see step 320d), and utilizing, e.g., Latin Hypercube Sampling, hundreds of simulations are run (see step 430). With hundreds of input sets into the reservoir model, hundreds of sets of parameter output value sets are generated (see step 440) thereby propagating uncertainties through the simulation. One output set, which was generated by the input set into the reservoir model having the average ("best guess") value of each input parameter, will generate "best guess" values for each output parameter. The output parameters may include water saturation, carbon dioxide saturation, pore-fluid pressure, water salinity, and the fluid density, all with uncertainty characterizations. Performance metrics such as spatial (lateral and/or radial) extent of the $CO_2$ plume, total dissolved $CO_2$, total trapped $CO_2$, etc. may then be calculated by the reservoir simulator from the output parameters at step 440 and as suggested by the right hand side of FIG. 16. According to another aspect of the invention, additional variable sets may be generated and run through the reservoir model until the there is a convergence in the PDF or CDF for a particular (or all) output variable.

Using the sets of variables generated for Scenario A as inputs into the reservoir model, output variables and their associated uncertainty are generated. From these, performance metrics with associated uncertainty are calculated. FIG. 17 are answer product representations of CDFs for four performance metrics (radial extent of $CO_2$ plume, trapped $CO_2$, mobile $CO_2$, dissolved $CO_2$) resulting from Scenario A. For Scenario A, from FIG. 17, it is seen that if 400,000 tonnes of $CO_2$ are injected over four years in the twenty feet thick bottom zone of the Dantzler formation, the radial extent of the plume after 50 years with almost 100% probability will reach beyond 3200 ft from the wellbore; with 80% probability will reach beyond 4600 ft. from the wellbore; with 50% probability will reach beyond 5000 ft from the wellbore; with 80% probability it will reach within 5600 ft from the wellbore; and with 100% probability it will stay within 6000 ft of the wellbore. The CDF for trapped $CO_2$ suggests that after fifty years, with 100% probability, between twenty and seventy percent of the $CO_2$ will be trapped; with 20% probability, between twenty and thirty-two percent will be trapped; with 40% probability, between twenty and forty-two percent will be trapped; with 70% probability, between twenty and fifty-six percent will be trapped, etc. The CDF for mobile $CO_2$ suggests that after fifty years, with 100% probability, between twenty-six and seventy percent of the $CO_2$ will be mobile; with 40% probability, between twenty-six and forty percent of the $CO_2$ will be mobile; with 60% probability, between twenty-six and fifty percent of the $CO_2$ will be mobile, and with 80% probability between twenty-six and sixty percent of the $CO_2$ will be mobile. The CDF for dissolved $CO_2$ suggests that after fifty years, with 100% probability, between 6.75% and 15% of the $CO_2$ will be dissolved; with 20% probability, between 6.75% and 8% of the $CO_2$ will be dissolved; with 60% probability, between 6.75% and 10% of the $CO_2$ will be dissolved, and with 80% probability, between 6.75% and 11% of the $CO_2$ will be dissolved. It should be noted that the sum of the trapped, mobile, and dissolved carbon dioxide should equal 100%.

For example, it should be appreciated that if it is acceptable, for the radial extent of the plume after 50 years to reach up to 6000 ft. from the wellbore, and for as much as 65% of the $CO_2$ to be mobile (regardless of the amount of trapped and dissolved $CO_2$), then the uncertainty level for these performance metrics might be acceptable at step 145, and a decision might be made to proceed with injection at 175. On the other hand, if the uncertainty level for either of these two performance metrics (or the levels for the trapped or dissolved $CO_2$) is not acceptable, then a sensitivity analysis might be conducted, measurements taken (such as the measurements associated with Scenario B) and the procedure repeated.

FIG. 18 provides answer product representations of CDFs for the same four performance metrics, this time comparing the results from Scenario A with results from Scenario B. As shown in FIG. 18, in Scenario B, with 100% probability, the radial extent of the plume is located between 2800 and 5600 ft, and with 20% probability it is located within 4200 ft of the wellbore. The probability with respect to the plume extent is very notable at 5000 ft. In Scenario B, there is 80% probability that the plume will not extend beyond 5000 ft, whereas in Scenario A, the certainty was only about 40%. The results of Scenario B with respect to trapped $CO_2$ and mobile $CO_2$ are very similar to Scenario A, except that the mobile $CO_2$ is more likely between 30% and 75 rather than between 25% and 70%. As seen in the bottom right graph of FIG. 15, the answer product with respect to the dissolved $CO_2$ for Scenario B has less uncertainty than Scenario A, as the amount of dissolved $CO_2$ will be between 6% and 9% with 95% probability.

It should be appreciated that if it is acceptable, e.g. for the radial extent of the plume to extend up to 5600 ft from the wellbore, and for as much as 70% of the $CO_2$ to be mobile (regardless of the amount of trapped and dissolved $CO_2$), then the uncertainty level for the performance metrics of Scenario B might be acceptable at step 145, and a decision might be made to proceed with injection at 175. On the other hand, if the uncertainty level for either of these two performance metrics (or the levels for the trapped or dissolved $CO_2$) is not acceptable, then a sensitivity analysis might be conducted, additional measurements taken (such as the measurements associated with Scenario C) and the procedure repeated.

FIG. 19 provides answer product representations of CDFs for the same four performance metrics, comparing the results from Scenario C with results from Scenarios A and B. As shown in FIG. 19, in Scenario C, with 100% probability, the radial extent of the plume is located between 3000 and 5200 ft, and with 90% probability it is located within 5000 ft of the wellbore. The results of Scenario C with respect to trapped $CO_2$ and mobile $CO_2$ are much improved relative to Scenarios A and B. In particular, the trapped $CO_2$ with certainty will be within the reduced range of between 46% and 57%, and the mobile $CO_2$ with certainty will be within the reduced range of between 36% and 47%. The range of the dissolved $CO_2$ is also reduced to between approximately 7% and 8%.

It should be appreciated that if it is acceptable, e.g., for the radial extent of the plume after 50 years with 90% certainty to be contained within 5000 ft. from the wellbore, and for the mobile $CO_2$ to be less than 50% (for the amount of trapped $CO_2$ to be between 45% and 60% and the amount of dissolved $CO_2$ to be at least 7%), then the uncertainty level for the performance metrics of Scenario C would be acceptable at step 145, and a decision might be made to proceed with injection at 175. Of course, depending upon the circumstances, different threshold values and different certainties might be utilized or required. Thus, if the uncertainty level is still not acceptable, then another sensitivity analysis might be conducted, additional measurements identified, and performed (e.g. core analysis, packer interval pressure test), and the procedure repeated. It is noted that at some point, it may not be technically feasible to take additional measurements, in which case a decision may be made to abandon the project or to amend the injection program and rerun to the analysis stage. Likewise, at any point, a decision could be made that it is not economically feasible to run additional tests, at which point a decision may be made to abandon the project or change the injection program and rerun to the analysis stage.

In addition to the answer products shown in FIGS. 17-19, it will be appreciated that other answer products could be provided. For example, a time evolution graph of the percentage of trapped carbon dioxide is shown in FIG. 20. FIG. 20 shows that after ten years, it is 90% (P5 to P95) probable that at least 22% and at most 41% of the $CO_2$ will be trapped with the mean value of 32% trapped $CO_2$. At twenty years, the range is between at least 39% and at most 49% with the mean of 44%; at thirty years at least 44% and at most 52% with the mean of 48%; at forty years, at least 46% and at most 55% and at fifty years, at least 48% and at most 57% with the mean of 52%. It will be appreciated by those skilled in the art that the fifty year value of FIG. 20 corresponds to the Scenario C CDF of FIG. 19.

FIG. 21 is a representation of an answer product in the form of a probability contour map of the lateral extent of a $CO_2$ plume at another test site location. The gray-scale probability contour map of FIG. 21 (which is alternatively a color scale plot) was generated utilizing a 3D reservoir model and shows the probability that the $CO_2$ plume ($S_{CO2}$>0.05) which is generated by the injection of 1 Mt of $CO_2$ over 3 years into a wellbore W located at approximately (6400, 8900) ft reaches after 100 years outside a predetermined area or boundary B (indicated by the dashed rectangle). The dark inner section of the plot is shown with a probability of 1 (100%), and the outer contour has a probability of 0 (0%). As seen in FIG. 21, with the perimeter (property border) of the site as indicated, there is an approximately 60% probability that at location (3000, 8000), the plume will extend past the perimeter B. The percentage probability at location (4500, 5700) is approximately 40%; at location (7500, 8000) approximately 30%; and at location (6000, 10,000) approximately 20%. FIG. 21 also reveals that the location P of the possibility of the greatest radial extent beyond the perimeter is at approximately (2400, 7700), although of course, the possibility is very small.

Additional information useful in conjunction with the contour plot of FIG. 21 is seen with respect to FIG. 22 where X,Z and Y,Z probability contour plots of the carbon dioxide plume of FIG. 21 (but after a time of thirty years) are provided. FIG. 22 shows the probability that the plume is contained within given contour. Five quantiles are provided: 5%, 25%, 50%, 75% and 95%. FIG. 22 reveals the depth location where the plume is likely to extend radially the furthest. In particular, it is seen that at a depth Z of approximately 6510, the 75% contour extends to an X location of 3700 ft, while the 95% contour extends to approximately 2500 ft.

FIG. 23 provides answer product representations of first-order sensitivity indices for five input petrophysical parameters indicating their relative contribution to the estimated variance of the trapped $CO_2$ during the life of the project (see FIG. 1, steps 150, 160, and FIG. 5 steps 550, 560). For the estimate of trapped $CO_2$ after 50 years from the start of the project, uncertainty in residual $CO_2$ saturation has the largest effect on the uncertainty of the trapped $CO_2$ (more than 90% of the variance), with uncertainty in permeability contributing approximately 5% to the variance in the estimate of trapped $CO_2$. Thus, if the uncertainty with respect to the performance metrics is unsuitable, an answer product such as FIG. 23 can provide an indication of a desired measurement to reduce the uncertainty. Where residual carbon dioxide saturation is of highest interest, depending upon what other measurements have already been taken, it may be desirable, for example, to take core samples of the identified layers of the formation in order to reduce the uncertainty.

There have been described and illustrated herein several embodiments of methods for generating answer products relating to the sequestering of carbon dioxide within an underground formation. While particular embodiments of the invention have been described, it is not intended that the invention be limited thereto, as it is intended that the invention be as broad in scope as the art will allow and that the specification be read likewise. Thus, while particular simulation tools have been disclosed, it will be appreciated that other simulation tools could be used as well. Likewise, while certain tools have been disclosed for obtaining data from which input parameters to the simulation model can be generated, it will be appreciated that other tools could be utilized. It will therefore be appreciated by those skilled in the art that yet other modifications could be made to the provided invention without deviating from its spirit and scope as claimed.

What is claimed is:

1. A method for evaluating a carbon dioxide ($CO_2$) sequestration site, comprising:
   a) obtaining data relating to the site;
   b) generating primary input parameter values;
   c) calculating reservoir model input parameters utilizing a pore-level physics model from a realization of the primary input parameter values;
   d) constructing a reservoir simulation model using the reservoir model input parameters;
   e) generating output values using the reservoir simulation model;
   f) converting the output values into values of a performance metric;
   g) repeating the calculating, constructing, generating, and converting until statistical convergence of a probability distribution of the performance metric;
   h) determining whether uncertainty represented by an answer product generated from the performance metric probability distribution prohibits a definitive determination regarding the site based on predetermined criteria; and
   i) if said uncertainty of said performance metric values prohibit said definitive determination, performing a global sensitivity analysis for the performance metric in order to identify measurements associated with said site which will provide additional data which can reduce said uncertainty of the performance metric values.

2. A method according to claim 1, further comprising making identified measurements and repeating steps a) through g) utilizing additional data as part of steps a) and b).

3. A method according to claim 1, wherein said performing the global sensitivity analysis comprises calculating and ranking sensitivity indices to identify which model input parameters and associated measurements thereof will most reduce the performance metric uncertainty.

4. A method according to claim 3, wherein
   the reservoir model input parameters include porosity, vertical permeability, horizontal permeability, residual water saturation, residual carbon dioxide saturation, and salinity,
   the output values include water saturation, carbon dioxide saturation, fluid pressure, water salinity, and fluid density,
   the performance metric includes an answer product for at least one performance metric, said at least one performance metric being at least one of a spatial extent of a $CO_2$ plume, percentage trapped $CO_2$, percentage mobile $CO_2$, and percentage dissolved $CO_2$, $CO_2$ arrival time to a monitored location, pressure at a monitoring location, and a financial indicator, and
   an answer product is a plot of global sensitivity indices of the at least one input parameter for said at least one performance metric.

5. A method according to claim 1, wherein the definitive determination is of suitability of the site for storing $CO_2$, and said method further comprises injecting $CO_2$ into the site.

6. A method according to claim 1, wherein: said data relating to said sequestration site includes data from neighboring wells.

7. A method according to claim 1, wherein: said data relating to said sequestration site includes data obtained from a well at said sequestration site.

8. A method according to claim 1, wherein: said data obtained from a well at said sequestration site includes data obtained through the use of one or more of neutron-density, gamma ray, caliper, spontaneous potential, electromagnetic/array resistivity, and sonic logging tools.

9. A method according to claim 1, wherein the additional data include measurements obtained using a nuclear magnetic resonance tool, an elemental capture spectroscopy tool, a formation fluid sampling tool, a borehole imaging tool, a core sampling tool, a packer interval pressure test tool, or a combination thereof.

10. A method according to claim 1, wherein: said model input parameters include porosity, vertical permeability, horizontal permeability, residual water saturation, residual carbon dioxide saturation, and salinity.

11. A method according to claim 1, wherein said output values include water saturation, carbon dioxide saturation, fluid pressure, water salinity, and fluid density.

12. A method according to claim 1, wherein said performance metric is at least one of a spatial extent of a $CO_2$ plume, percentage trapped $CO_2$, percentage mobile $CO_2$, and percentage dissolved $CO_2$, $CO_2$ arrival time to a monitored location, pressure at a monitoring location, and a financial indicator.

13. A method according to claim 1, wherein the answer product is a cumulative distribution function plot of the performance metric.

14. A method according to claim 1, wherein the answer product is a plurality of probability related time evolution plots of the performance metric.

15. A method according to claim 1, wherein the answer product is a probability contour plot of the performance metric.

16. A method according to claim 1, wherein the answer product is a plot of a probability density function of the performance metric.

17. A method according to claim 1, wherein said the calculating reservoir model input parameter values includes identifying a top and a bottom of a formation identified for receiving said $CO_2$.

18. A method according to claim 1, wherein: said constructing a reservoir simulation model includes identifying a plurality of layers of a formation identified for receiving said $CO_2$.

19. A method according to claim 18, wherein: said identifying said plurality of layers comprises utilizing porosity information to identify said plurality of layers.

20. A method according to claim 19, wherein: said identifying said plurality of layers further comprises further utilizing at least one of gamma-ray, spontaneous potential, NMR relaxation, resistivity, and sonic velocities information.

* * * * *